(12) United States Patent
Han et al.

(10) Patent No.: US 11,195,211 B2
(45) Date of Patent: Dec. 7, 2021

(54) SYSTEMS, METHODS AND COMPUTER PROGRAM PRODUCTS FOR GENERATING SCRIPT ELEMENTS AND CALL TO ACTION COMPONENTS THEREFOR

(71) Applicant: Spotify AB, Stockholm (SE)

(72) Inventors: Lu Han, New York, NY (US); Rachel M. Bittner, Brooklyn, NY (US)

(73) Assignee: Spotify AB, Stockholm (SE)

( * ) Notice: Subject to any disclaimer, the term of this patent is extended or adjusted under 35 U.S.C. 154(b) by 113 days.

(21) Appl. No.: 16/414,387

(22) Filed: May 16, 2019

(65) Prior Publication Data

US 2019/0355024 A1 Nov. 21, 2019

Related U.S. Application Data

(60) Provisional application No. 62/672,898, filed on May 17, 2018.

(51) Int. Cl.
| | |
|---|---|
| *G06Q 30/02* | (2012.01) |
| *G10L 19/00* | (2013.01) |
| *G10L 21/013* | (2013.01) |
| *G10L 21/0232* | (2013.01) |
| *G06F 3/16* | (2006.01) |

(52) U.S. Cl.
CPC .......... *G06Q 30/0276* (2013.01); *G10L 19/00* (2013.01); *G10L 21/013* (2013.01); *G10L 21/0232* (2013.01); *G06F 3/165* (2013.01); *G10L 2021/0135* (2013.01)

(58) Field of Classification Search
CPC ... G06Q 30/0276; G10L 19/00; G10L 21/013; G10L 21/0232; G10L 2021/0135; G06F 3/165
See application file for complete search history.

(56) References Cited

U.S. PATENT DOCUMENTS

| | | | |
|---|---|---|---|
| 8,521,679 B2 | 8/2013 | Churchill et al. | |
| 8,750,843 B2 * | 6/2014 | Forrester | H04L 65/602 |
| | | | 455/414.1 |
| 9,245,280 B2 | 1/2016 | Zheng et al. | |
| 9,355,627 B2 | 5/2016 | Ales | |

(Continued)

FOREIGN PATENT DOCUMENTS

| | | |
|---|---|---|
| CN | 104506964 A1 | 4/2015 |
| EP | 2410444 A2 | 1/2012 |

OTHER PUBLICATIONS

System for Enabling Audio Delivery of Internet Content Saida Herzi An IP.com Prior Art Database Technical Disclosure IP.com Electronic Publication Date: Jan. 29, 2003 (Year: 2003).*

(Continued)

*Primary Examiner* — Alexandru Cirnu
(74) *Attorney, Agent, or Firm* — Merchant & Gould P.C.

(57) ABSTRACT

A call to action processor receives an entity datapoint containing data related to an entity, a campaign objective datapoint containing data associated with a campaign objective, at least one definite script element based on the campaign objective, and entity metadata containing data associated with the entity. The call to action further performs generating at least one variable script element based on the entity metadata, presenting to a device the at least one definite script element the at least one variable script element.

19 Claims, 20 Drawing Sheets

(56) References Cited

U.S. PATENT DOCUMENTS

| | | | |
|---|---|---|---|
| 9,397,969 B2 | 7/2016 | Torrenegra et al. | |
| 9,711,179 B2 | 7/2017 | Axen et al. | |
| 9,721,321 B1 | 8/2017 | Nayeri | |
| 9,721,551 B2 | 8/2017 | Silverstein | |
| 9,959,557 B2* | 5/2018 | Bharath | G10L 13/00 |
| 10,392,022 B1 | 8/2019 | Rau | |
| 10,528,977 B1* | 1/2020 | Jogia | G06Q 30/0641 |
| 2006/0075430 A1 | 4/2006 | Park | |
| 2007/0120975 A1 | 5/2007 | Tsai | |
| 2008/0249855 A1 | 10/2008 | Collins et al. | |
| 2009/0150445 A1 | 6/2009 | Herberger | |
| 2011/0225565 A1 | 9/2011 | van Velzen et al. | |
| 2011/0243344 A1 | 10/2011 | Bakalos | |
| 2014/0279032 A1 | 9/2014 | Roever et al. | |
| 2015/0220853 A1 | 8/2015 | Marcheret | |
| 2015/0332341 A1* | 11/2015 | Gadoury | G06Q 30/0251 705/14.66 |
| 2015/0356136 A1 | 12/2015 | Joshi | |
| 2015/0379224 A1* | 12/2015 | Rosen | G06F 19/3418 705/2 |
| 2016/0371122 A1 | 12/2016 | Nair | |
| 2016/0379274 A1 | 12/2016 | Irwin | |
| 2017/0099592 A1* | 4/2017 | Loeb | G06Q 10/107 |
| 2017/0177135 A1* | 6/2017 | Sarin | G06Q 20/10 |
| 2018/0225721 A1 | 8/2018 | Bharath et al. | |
| 2018/0260857 A1 | 9/2018 | Kar et al. | |
| 2018/0341990 A1 | 11/2018 | Bardin et al. | |
| 2019/0228766 A1* | 7/2019 | White | G06Q 10/109 |
| 2019/0244257 A1 | 8/2019 | Goldman et al. | |

OTHER PUBLICATIONS

Hector Garcia-Molina et al. "Sagas", Princeton University, Princeton, Nj, US, 16/3, pp. 249-259 (Dec. 1987).

Judith C. Brown "Calculation of a constant Q spectral transform", Accoustical Society of America, US, 89/1, pp. 425-434 (Jan. 1991).

Siddiquee et el. "A personalized music discovery service based on data mining." 2015 IEEE/ACIS 14th Internatinoal Conference on Computer and Information Science, pp. 253-258.

Chen et al. "Mixed Stereo Audio Classification Using a Stereo-Input Mixed-t-Panned Level Feature." IEEE/ACM Transactions on Audio, Speech, and Language Processing vol. 22, No. 12, pp. 2025-2033, (2014).

S. Ali and P. Aarabi, "A Cyclic Interface for the Presentation of Multiple Music Files," in IEEE Transactions on Multimedia, vol. 10, No. 5, pp. 780-793, Aug. 2008, doi: 10.1109/TMM.2008/922848. (Year: 2008).

* cited by examiner

300B

✓ ——— ② ——— ③
Set Up      Budget & Audience      Ad Creative

Demographic Audience
Locations
Target listeners by country, region, state or DMA.
[🔍 Search]

Age
[13 ▼] – [65+ ▼]

Gender
[All] [Female] [Male]

310

Listening Behavior
Genres Optional
[🔍 Search ▼]

Platforms
☑ All  ☑ iOS (iPhone/iPad)  ☑ Android  ☑ Desktop

312

Budget and Schedule
Start              End
[08/24/2017]  –  [08/24/2017]

[12:01 AM]        [11:59 PM]

Total Budget
The budget will be evenly distributed between the start and end dates.
[$500] [$1000] [$1500] [Custom]

Payment Method
Please Connect a payment account to continue.  [CONNECT]
You will be redirected to a new page.
Don't worry, your changes will be saved.

314

[BACK]                              [NEXT]

---

Selected Audience
Locations
*Please Select*
Age Range
13 – 65+
Gender
All
Genres
None
Platforms
All

The Audience XYZ
$0.025/ad listen

Active Dates
08/24/2017 - 08/24/2017
Budget
$250
XYZ
[▬▬▬▬▬▬]
Please complete the form

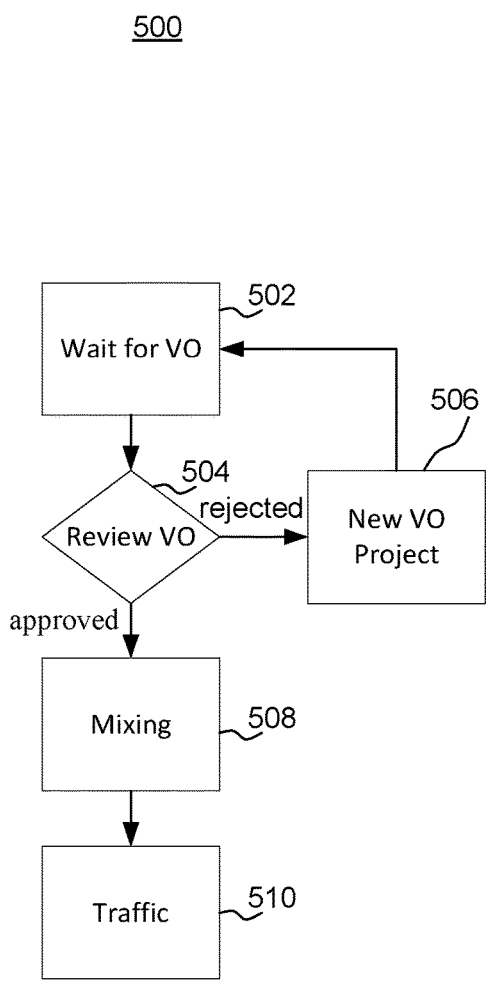
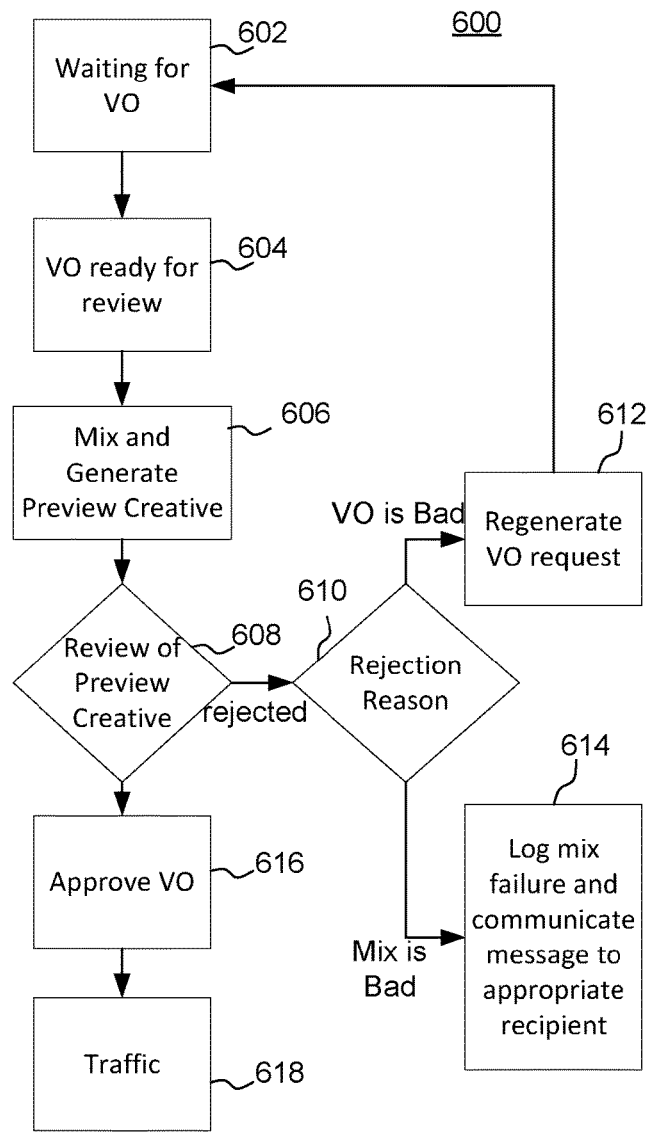
FIG. 5
FIG. 6

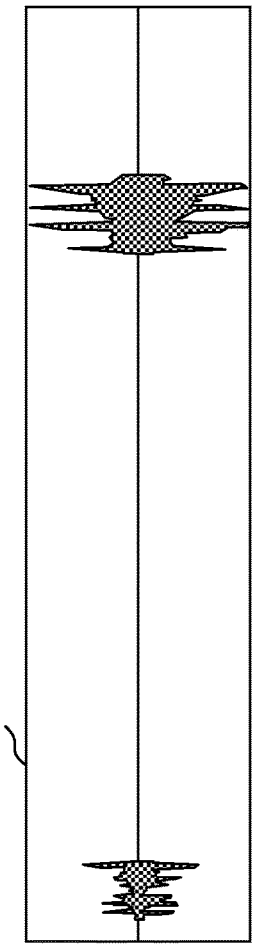

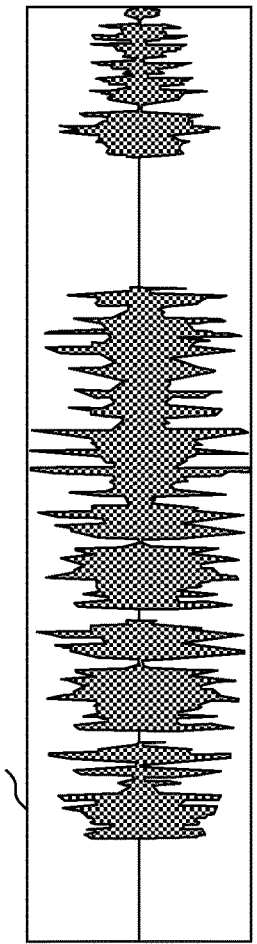

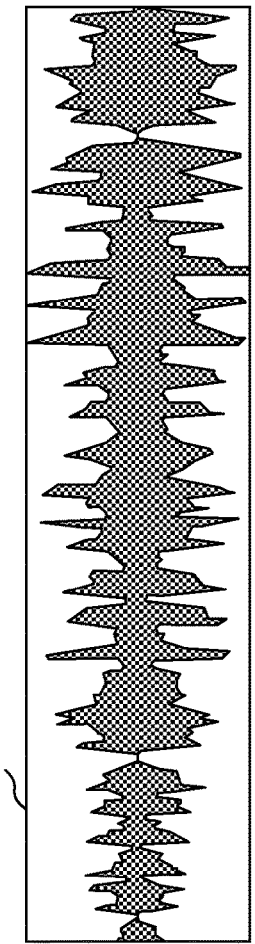

FIG. 13

Personalized Spot:

"Hey Thomas, _____ to the Majestic Theatre in Madison Wisconson on Friday October 21st. _____ ."

Generic Spot:

" _____ did you Know that Saint Lucia is Going to Light Up the Stage with Special Guests Chris Z. After Opening for the Likes of Ellie S., Susan P. and Al Zio, Saint Lucia is Ready to Bring the Dance Party _____ .Tickets on Sale Now at www dot Majestic Madison dot com."

Background Music:

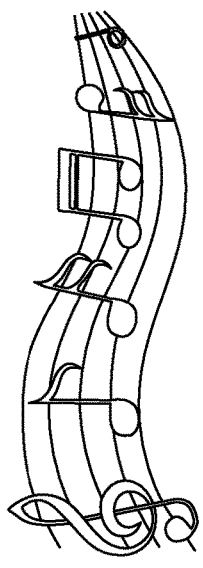

SYSTEMS, METHODS AND COMPUTER PROGRAM PRODUCTS FOR GENERATING SCRIPT ELEMENTS AND CALL TO ACTION COMPONENTS THEREFOR

CROSS REFERENCE TO RELATED APPLICATIONS

This application claims priority to, and the benefit of, U.S. Provisional Patent Application Ser. No. 62/672,898, filed May 17, 2018, which is hereby incorporated by reference in its entirety.

TECHNICAL FIELD

Example aspects described herein relate generally to creative generation and creative trafficking systems, and in particular to a system, a method, an apparatus and a non-transitory computer-readable storage medium for generating script elements and call to action components therefor.

DESCRIPTION OF RELATED ART

Existing solutions for generating and trafficking creatives involve processes that are variable and require different levels of effort and cost, as well as significant interaction through the use of several tools. Creative content providers would like to hedge their goals across different and new creative types and campaigns, but existing technology limits their ability to do so. Backend, foundational infrastructure for performing such functionality is lacking. One challenge in developing such an infrastructure lies in the lack of technology capable of generating creative content based on a minimal number of input signals.

There is a need for technology that provides the connections and interplay between the functional components through which data and content associated with different types of creatives can flow and be processed efficiently. Performing existing processes using conventional functional components and pipelines becomes a significant engineering challenge in view of failure modes, recovery options, retries, notifications and the like. In addition, significant engineering challenges have prohibited the extent to which the workflows in the pipeline can be automated.

Many types of audio content, such as advertisements ("ads"), radio shows, podcasts, or movie soundtracks require a recording of a voice to be mixed with background music or a soundscape. The mix needs to be balanced, so that the background is audible but does not overpower the voice. Existing voiceover mixing solutions, require trained audio engineers to manually create mixes and masters. However, this manual process is time consuming, subjective and costly, making it near impossible to scale. Accordingly, there is need for a voiceover mixing technological solution that automates the processes performed by the mixing engineering that allows for the scalable creation of audio creatives.

Finding media content (e.g., music that is both available for use in advertisements and fits a desired mood) is difficult. Often advertisers will know what they want the music to sound like and need a way to search through potentially large catalogs of available music.

Existing solutions such as those supplied by FREE-SOUND or MELODYLOOPS (www.freesound.org, www.melodyloops.com) provide a mechanism to search through a collection of content using metadata or semantic tags (e.g. "acoustic", "corporate"). These technologies typically allow searching through the use of tag-based filtering.

However, tag-based filtering limits the search to a specific set of pre-existing terms and there is not always a universal perception of how media content should be categorized. For example, there is no universal perception of what "corporate" music sounds like. Metadata allows users to search through titles and artists, but if the catalog contains unfamiliar (e.g., music) content, this information is not meaningful to the user. The user may know what they like, but not how to describe it.

Solutions for measuring similarity are described in Dieilman, S., "Recommending music on Spotify with deep learning", Spotify (2014). The methods provide technical solutions to the problem of predicting listening preferences from audio signals by training a regression model to predict the latent representations of songs that were obtained from a collaborative filtering model. While the methods described in Dieilman are useful for creating a deep neural network that can be used to create an n-dimensional vector for use with content-based recommendation systems, it does not provide a technique for comparing songs where listening data is unavailable.

Advertisers running campaigns in multiple locations create ads that are all the same except for a segment that is specific to the location (for example, concert tours). More specific levels of personalization, like saying the listener's name, are not feasible because of the amount of time required to produce all variations. Existing solutions require that ads be created manually. Existing solutions do not provide hyper-personalized ads. There is a need therefore, for a technical solution that can personalize or localize creatives at scale.

BRIEF DESCRIPTION

In an example embodiment, a computer-implemented method for voiceover mixing is provided. The method includes receiving a voiceover file and a music file; audio processing a voiceover file to generate a processed voiceover file; audio processing a music file to generate a processed music file; weighted summing the processed voiceover file and the processed music file to generate a weighted combination of the processed voiceover file and the processed music file; single band compressing the weighted combination; and generating a creative file containing a compressed and weighted combination of the processed voiceover file and the processed music file.

In some embodiments, the method further includes measuring the energy level of the voice file within a frequency range; and filtering the frequency range if the energy level exceeds a predetermined threshold.

In some embodiments, the audio processing the voiceover file includes normalizing, compressing and equalizing the voiceover file and the audio processing the music file includes normalizing, compressing and equalizing the music file. The voiceover file and the music file are normalized, compressed and equalized asynchronously.

In some embodiments, the method further includes storing, in a voice activations store, a curve corresponding to when a voice is present in the voiceover file.

In some embodiments, the method further includes setting an advertisement duration time; setting a start time for the voiceover file; trimming the music file according to the advertisement duration time; and mixing the voiceover file and the music file according to the start time and the advertisement duration time.

In some embodiments, the method further includes generating a script; converting the script to voice content; and saving the voice content in the voiceover file.

In yet other embodiments, the method further includes mapping each track in a library of tracks to a point in an embedding space; computing an acoustic embedding based on a query track within the embedding space; obtaining a track from the library of tracks with acoustically similar content; and saving the track from the library of tracks with acoustically similar content in the music file.

In another example embodiment there is provided system for voiceover mixing. The system includes a voice processor, a music processor and a mixing processor. The voice processor is operable to receive a voiceover file, and generate a processed voiceover file from the voiceover file. The music processor is operable to receive a music file, and generate a processed music file from the music file. The mixing processor is operable to weight sum the processed voiceover file and the processed music file to generate a weighted combination of the processed voiceover file and the processed music file, single band compress the weighted combination, and generate a creative file containing a compressed and weighted combination of the processed voiceover file and the processed music file.

In some embodiments, the voice processor is further operable to measure the energy level of the voice file within a frequency range; and filter the frequency range if the energy level exceeds a predetermined threshold.

In some embodiments, the voice processor is further operable to normalize, compress and equalize the voiceover file and the music processor further operable to normalize, compress and equalize the music file. The voiceover file and the music file are normalized, compressed and equalized asynchronously.

In some embodiments, the system for voiceover mixing further includes a voice activations store operable to store a curve corresponding to when a voice is present in the voiceover file.

In some embodiments, the system for voiceover mixing further includes an advertisement store operable to store an advertisement duration time. The voice processor is also further operable to set a start time for the voiceover file and the music processor further operable to trim the music file according to the advertisement duration time. The mixing processor mixes the voiceover file and the music file according to the start time and the advertisement duration time.

In yet other embodiments, the system for voiceover mixing further includes a script processor, a text to voice processor and a voiceover store. The script processor is operable to generate a script from at least one script section. The text to voice processor is operable to convert the script to voice content. The voiceover store is configured to save the voice content in the voiceover file.

In some embodiments the system for voiceover mixing further includes a background music search processor. The background music search processor operable to: map each track in a library of tracks to a point in an embedding space; compute an acoustic embedding based on a query track within the embedding space; obtain a track from the library of tracks with acoustically similar content; and save the track from the library of tracks with acoustically similar content in the music file.

In yet another example embodiment, there is provided a non-transitory computer-readable medium having stored thereon one or more sequences of instructions for causing one or more processors to perform the voiceover mixing procedures described herein.

Another aspect of the present invention includes a computer-implemented call to action method. The method includes receiving an entity datapoint containing data related to an entity; receiving a campaign objective datapoint containing data associated with a campaign objective; receiving at least one definite script element based on the campaign objective; receiving entity metadata containing data associated with the entity; generating at least one variable script element based on the entity metadata; presenting to a device the at least one definite script element; and presenting to the device the at least one variable script element.

In some embodiments, the method further includes receiving a user datapoint containing data associated with a user of the device and generating at least one variable script element based on the user datapoint.

In some embodiments, the method further includes selecting one of a plurality of possible script elements to obtain a selected script element and communicating over a network the selected script element.

In some embodiments, the method further includes receiving over a network an information item from the device; determining whether the information item from the device meets a condition; and presenting a first call to action script via the device if the information item meets the condition; and presenting a second call to action via the device if the information item does not meet the condition.

In some embodiments, the method further includes receiving an indication from a device whether a user of the device is in focus. If the user of the device is in focus, the method performs presenting a first call for action script element via the device. If the user of the device is not in focus, the method performs presenting a second call for action script element via the device.

In some embodiments, the method further includes determining whether a response has been received by the device. If no response has been received by the device, the method performs presenting via the device a no-response message indicating that no response has been received. If a valid response has been received by the device, the method performs presenting via the device a valid response message indicating that a response has been received. If an invalid response has been received by the device, the method performs presenting via the device an invalid response message and communicating another call for action script.

In some embodiments, the method further includes determining if the device receives a tap; performing a first operation if the device received the tap; and performing a second operation if the device did not receive the tap.

In another example embodiment, there is provided a system for performing call to action including a call to action processor operable to: a receive an entity datapoint containing data related to an entity; receive a campaign objective datapoint containing data associated with a campaign objective; receive at least one definite script element based on the campaign objective; receive entity metadata containing data associated with the entity; generate at least one variable script element based on the entity metadata; present to a device the at least one definite script element; and present to the device the at least one variable script element.

In some embodiments, the call to action processor is further operable to receive a user datapoint containing data associated with a user of the device and generate at least one variable script element based on the user datapoint.

In some embodiments, the call to action processor further operable to select one of a plurality of possible script elements to obtain a selected script element and communicate over a network the selected script element.

In some embodiments, the call to action processor is further operable to receive over a network an information item from the device; determine whether the information item from the device meets a condition; and present a first call to action script via the device if the information item meets the condition; and present a second call to action via the device if the information item does not meet the condition.

In some embodiments, the call to action processor is further operable to receive an indication from a device whether a user of the device is in focus. If the user of the device is in focus, the call to action processor presents a first call for action script element via the device. If the user of the device is not in focus, the call to action processor presents a second call for action script element via the device.

In some embodiments, the call to action processor is further operable to determine whether a response has been received by the device. If no response has been received by the device, the call to action processor presents via the device a no-response message indicating that no response has been received. If a valid response has been received by the device, the call to action processor presents via the device a valid response message indicating that a response has been received. If an invalid response has been received by the device, the call to action processor presents via the device an invalid response message and communicating another call for action script.

In some embodiments, the call to action processor is further operable to determine if the device receives a tap; perform a first operation if the device received the tap; and perform a second operation if the device did not receive the tap.

In yet another example embodiment, there is provided a non-transitory computer-readable medium having stored thereon one or more sequences of instructions for causing one or more processors to perform the call to action procedures described herein.

BRIEF DESCRIPTION OF THE DRAWINGS

The features and advantages of the example embodiments of the invention presented herein will become more apparent from the detailed description set forth below when taken in conjunction with the following drawings.

FIG. 3B illustrates a graphical user interface in accordance with an example aspect of the present invention.

FIG. 5 illustrates an exemplary voiceover workflow definition for a voiceover approval process which can be executed with other workflows asynchronously in accordance with an example aspect of the present invention.

FIG. 6 illustrates another exemplary voiceover workflow definition for a voiceover approval process which can be executed by a voiceover request processor and mixer with other workflows asynchronously in accordance with an example aspect of the present invention.

FIG. 13 illustrates an example personalized spot, a generic spot and background music in accordance with an example aspect of the present invention.

DESCRIPTION

Figure 1:
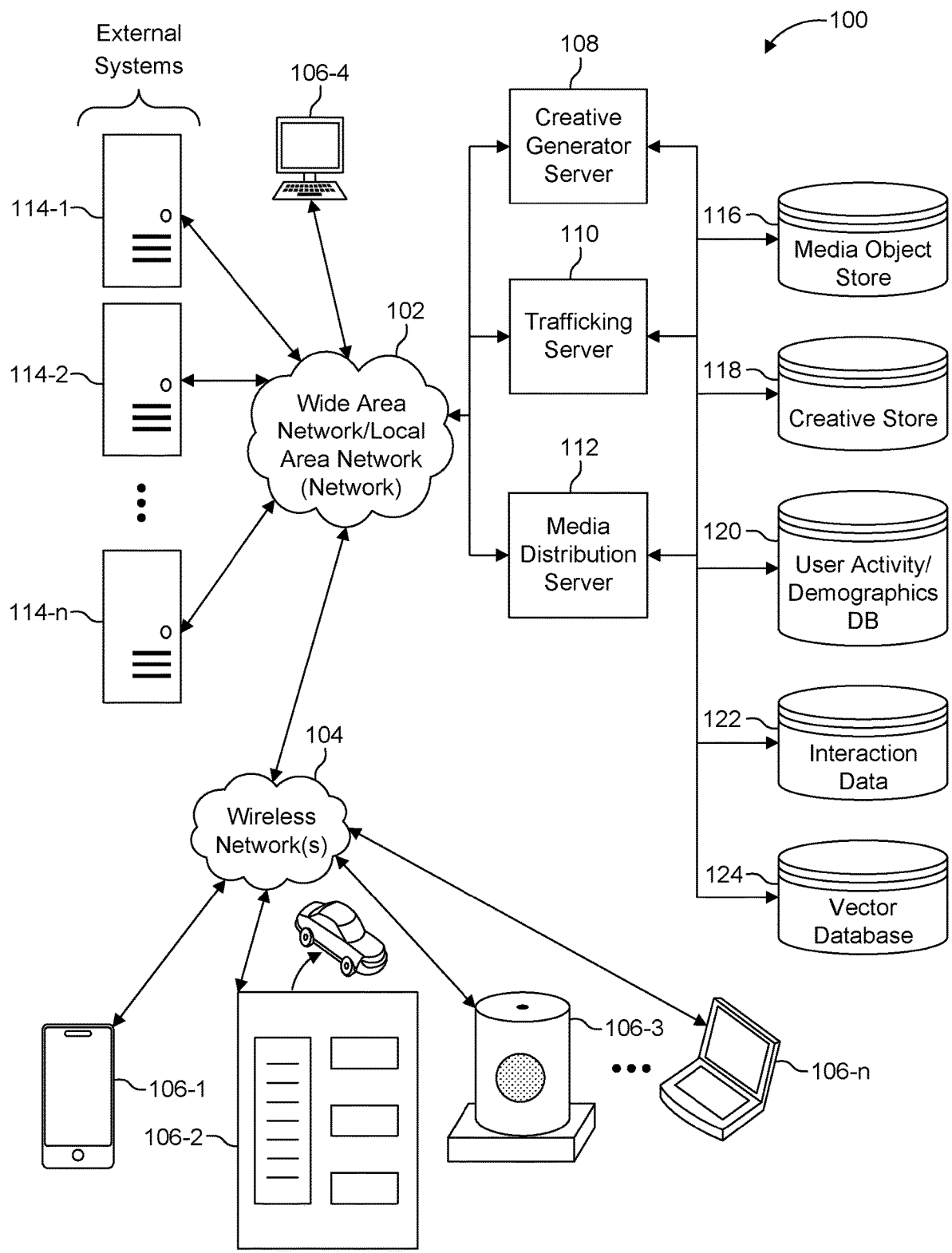
FIG. 1 illustrates an example system for generating and trafficking creatives in accordance with an example aspect of the present invention.

FIG. 1 illustrates an example system for generating and trafficking creatives. Not all of the components are required to practice the invention, and variations in the arrangement and type of the components may be made without departing from the spirit or scope of the invention. As used herein, the term "component" is applied to describe a specific structure for performing specific associated functions, such as a special purpose computer programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result. System 100 of FIG. 1 includes wide area networks/local area networks ("LANs/WANs")-(Network) 102, wireless network(s) 104, client devices 106-1, 106-2, 106-3, 106-4, . . . , 106-n (referred to collectively and individually as client device 106), a creative generator server 108, a trafficking server 110, a media distribution server 112 and one or more external systems 114-1, 114-2, . . . , 114-n (referred to collectively and individually as an external system 114).

Wireless network 104 is configured to communicatively couple client devices 106 and their components with network 102. Wireless network 104 may include any of a variety of wireless sub-networks that may further overlay stand-alone ad-hoc networks, and the like, to provide an infrastructure-oriented connection for client devices 106. Such sub-networks may include mesh networks, wireless LAN (WLAN) networks, cellular networks, and the like. Other now or future known types of access points may be used in place of network 102 and wireless network 104.

Generally, the creative generator server 108 and trafficking server 110 cooperatively operate to generate and traffic creatives. In some examples, a creative is in the form of a media content item. For simplicity as used herein, a creative media content time is sometimes simply referred to as a creative. Input specifying criteria for a creative is input via an input interface of an external system 114. In an example, embodiment, the input is provided to external system 114 via a client device 106 (e.g., client interface 106-4. In turn, the input is communicated to creative generator server 108 (via, e.g., WAN/LAN 102). Creative generator server 108 receives the input through from the network (e.g., WAN/LAN 102) and executes creative generation applications asynchronously. Trafficking server 110 executes trafficking workflows asynchronously for the purpose of communicating the creatives generated by creative generator server 108 to targeted media-playback devices. Each creative is, in turn, communicated through network 102 to a client device 106 that has been targeted to receive the creative. The client device 106, in turn, plays the creative.

System 100 also includes a media object store 116 that stores media objects, a creative store 118 that stores creatives that have been generated by creative generator server 108, a user activity/demographics database 120 that stores user activity and demographic data, an interaction database 122 that stores activity profiles associated with accounts (e.g., of users), and a vector database 124 that stores vectors in accordance with the embodiments described herein.

In one example embodiment there is provided an automated creative development platform that performs asynchronous execution of creative generation workflows and trafficking workflows via a message queue. The platform includes creative platform components that operate according to custom workflow definitions to manage such creative generation and trafficking workflows during execution. A workflow definition represents a process and describes the tasks involved in the process. Workflow definitions can include properties, events, methods, protocols, indexers, and the like. A workflow can be defined for one specialized component. In some embodiments a workflow can be defined for more than one specialized component. A specialized component can have multiple workflow definitions. The two workflows can reflect two different processes the specialized component can perform. In some embodiments, a specialized component can be involved in more than one workflow at a time. In some embodiments, the workflows can operate asynchronously.

The following non-limiting examples are described in terms of generating a creative that includes audio objects that have been previously stored in media object store 116. This description is not intended to limit the application of the example embodiments. In fact, after reading the following description, it will be apparent to one skilled in the relevant art(s) how to implement the following example embodiments in alternative embodiments. For example, by extending the platform to generate and traffic unique targeted creatives containing other types of media objects (e.g., video, text, etc.) in a variety of formats, and whether stored in media object store 116 or provided from a different source.

Figure 2:
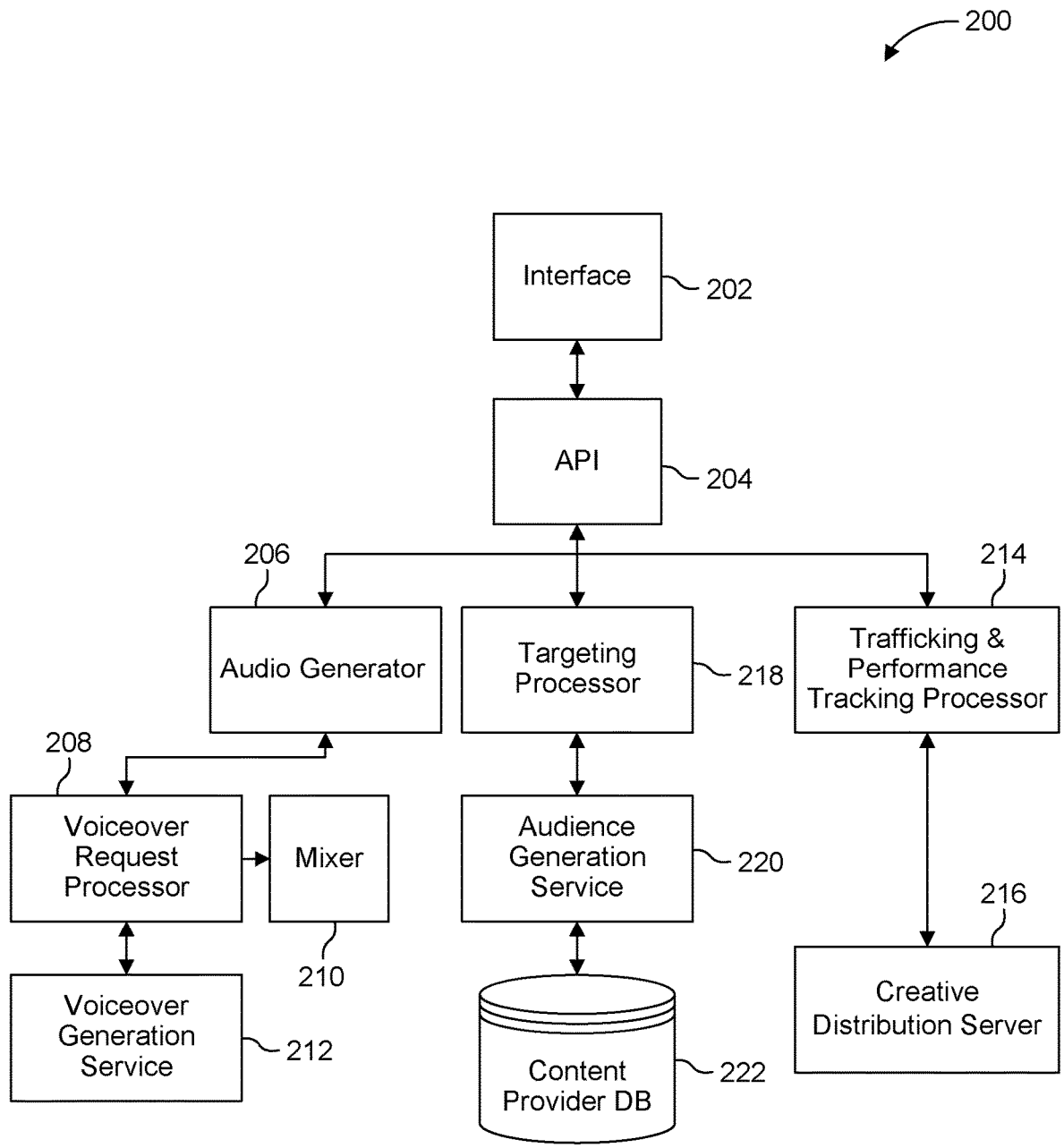
FIG. 2 illustrates a block diagram of an exemplary creative development platform including the applications executed by a creative generator server and a creative trafficking server in accordance with an example aspect of the present invention.

FIG. 2 illustrates a block diagram of an exemplary creative development platform 200 including the creative platform components executed by the creative generator server 108 (FIG. 1) and creative trafficking server 110 (FIG. 1). In an example embodiment, creative platform components include an audio generator 206, a voice request processor 208, a mixer 210, and voiceover generation service 212. Creative platform components also can include a targeting processor 218, audience generation service 220, and a content provider database 222. Creative platform components also can include a trafficking and performance tracking processor 214 and a creative distribution server 216. The features and advantages of the creative platform components presented herein will become more apparent from the detailed description set forth below when taken in conjunction with the respective drawings.

An input interface 202 contains definitions used to mediate the exchange of information between the creative platform components of creative development platform 200 as well as external systems 114 (FIG. 1) that can provide external sources of data (i.e., data that is external to creative development platform 200).

In some embodiments, input interface 202 provides a control configured to receive input data to modify the definitions. In some embodiments, the control can take the form of a user interface (UI) designed into a device with which a person may interact. This can include display screens, keyboards, and/or a mouse or other input device that allow a user to interacts with the input interface 202 to modify the workflow definitions or applicable data. The modification to the workflow definitions, in turn, generate modified workflow definitions that are used to generate one or more creatives having specified properties. In some embodiments, such modifications to the workflow definitions modify the traffic properties that define how the creative is trafficked. For example, input interface 202 can be configured to adjust input data through the use of an editor that receives input to vary the individual properties of the input data (e.g., data elements originally entered via input interface 202, such as tone, rhythm, etc.).

In one non-limiting example, input interface 202 can receive description information that contains data elements (e.g., attributes) describing a particular deliverable (e.g., targeted creative). The input is saved as one or more creative input objects containing data elements defining a particular deliverable.

In some embodiments, the input data can be provided through input interface 202 includes, for example, background media content, a script for a voiceover, a tone of a voiceover, one or more targeting parameters, one or more timing parameters. Examples of such information includes a name of a song or track identifier (ID), voiceover script ID, emotional tone and rhythm, time(s) and date(s), images, and other metadata, correspondingly.

With reference to both FIGS. 1 and 2, in some embodiments, creative development platform 200 includes an application programming interface (API) 204 that processes the data provided from/to the interface 202. As shown in FIG. 2, API 204 is between the input interface 202 and various components of creative development 200 (e.g., servers and functions those servers perform) that in conjunction are used to generate a creative containing media objects such as images, an audio segments, and/or video clips, automatically.

The parameters of the input data are processed by the corresponding creative platform components of creative development platform 200. Different kinds of targeted requests, for example, have respective flows. In addition, these different sequential steps are performed on the input data. Such creative platform components perform: mixing, transcoding, sending emails, and the like. Together the creative platform components of creative development platform 200 generate a creative in the form of a targeted media content item.

Example aspects provide a definition of the workflow and workers that perform the various steps within the workflow. Workflows are processed by workers which are programs that interact with processors that coordinate work across components of the creative development platform 200 to get tasks, process them, and return their results. A worker implements an application processing step. In some embodiments, the workflows executed by the workers provide recovery mechanisms, retry mechanisms, and notification mechanisms.

Each function described above in connection with FIG. 2 is automated. Automation is used, for example, to create the parameters that are incorporated in the creative, to generate audio, and to control trafficking.

Each of the steps of a workflow is performed by the various functions is performed asynchronously. As such, one function flow is not waiting for the result of another function flow. Once a series of steps are initiated those steps are performed in the background by the workers. A view of the output (i.e., a view of a media object) is returned via an interface. Optionally a view of the output is returned via an interface at each step. If necessary, a notification is issued (e.g., via an interface) requesting additional input. The individual workflows are performed asynchronously. A responses initiated within each flow (e.g., a notification or request for additional information) that are communicated through, for example, the interface, are synchronous.

The example embodiments execute a number of workflows depending on the input they receive. For example various types of input can be received through the interface. Depending on the type of input, a different workflow is performed. For example, if a media content item or location of a media content item (e.g., a background track) is input, one workflow is performed. If no such input is received, then another workflow is performed, for example, which either requests or otherwise obtains a different type of input.

In an example embodiment, logic determines, based on some combination of inputs, a particular flow that should be implemented. Each flow returns a result (e.g., a return value such as a Boolean value). If each step is successful (as defined by a predetermined measure of success), the worker returns a success message, and the manager for the entire flow or pipeline knows to step the media object (e.g., an audio advertisement to be transmitted) to its next successful state based on the workflow definition. If a failure during the flow occurs, the individual workflow can handle the failure mode itself. In some embodiments, the workflow may not be capable of resolving the failure mode but, according to a corresponding workflow definition may be arranged to retry a sequence of steps. In other words, the workflow, workflow definition and type of error dictate the response and output. For example, if the cause of the failure mode is the workflow itself, the workflow definition may have a solution to the failure that caused the failure mode. In some embodiments, a first workflow may be expecting data from another component of the system and not receive it in a timely manner. In one non-limiting example, the first workflow can continue moving forward through its steps without waiting for the data to be prepared e.g., by a second workflow because the data needed by the first workflow is still being prepared by the second workflow and may take additional time to prepare.

In an example embodiment, each independent routine, e.g., waiting for a voiceover, generating a new voiceover project, mixing, and trafficking are workers in the pipeline manager. Every worker has a defined logic that it performs. A mixing worker, for example, calls scripts that perform certain functionality. If the mixing worker performs the scripts successfully, the mixing worker causes a mixed media object (e.g., audio advertisement) to be stored in memory so that it can, in turn, be accessed for other steps and returns a message indicating that it executed its flow successfully. If for example, the mixing worker performs a script that fails, then the mixing worker returns a message or value indicating that it has failed. The term "script" is used herein in the context of computer science and in the context of writings.

In the context of computer science, the term script is used as a list of commands that are executed by a certain program or scripting engine. Scripts may be used to automate processes on a component.

In the context of writing, a script is the letters or characters used in writing. A voiceover, for example, can be read from a script and may be spoken by someone who appears elsewhere in the production or by a specialist voice talent. In some embodiments, the voiceover is synthesized using, for example, a text to speech synthesizer that converts the script to speech.

Every worker also has its own definition for what is successful. In the case of a mixing worker, for example, if an internal process in the mixing stage has determined that an internal stage has failed (e.g., a voiceover is silent indicating that the voiceover mixing has failed), then the mixing worker returns a message indicating that the mixing stage has failed. Every worker has its own definition of what is successful and what is a failure.

Example embodiments described herein can also provide automated routing and failure (e.g., retries) and recovery handling (e.g., fallback). In addition, the embodiments allow the various functions to be modular and for different workflows to be defined. If one worker fails, the logic for how it would fallback is dependent on the type failure. Each worker can thus be performed more than one time safely.

In an exemplary embodiment, the individual creative platform components may not be part of a sequential workflow. In other words, they do not know that they are going to flow at all, they just know that they might being called. This allows the manager to be untethered to any particular workflow.

Pipeline manager is given all of the workers and workflow definitions. The pipeline manager, using the workflow definitions executes the workers in sequence and manages predefined successes and failures.

Graphical User Interfaces for Receiving Creative-Related Datapoint Values

FIGS. 3A, 3B, 3C and 3D illustrate graphical user interfaces that can be provided (e.g., rendered on an interface of a device) by user input interface 202. As used herein, a graphical user interface is a form of user interface that allows users to interact with a computer or electronic device through graphical icons or visual indicators using items such as windows, icons, command links, radio buttons, check boxes, text boxes, and menus. In some embodiments, a graphical user interface presents such items to obtain datapoint values. In turn, the datapoint values obtained via the graphical user interfaces are used to generate and traffic creatives.

The user interfaces depicted in FIGS. 3A, 3B, 3C and 3D can be used to provide selectable or Tillable fields to obtain datapoint values (also referred to as input data, signals or simply datapoint). In turn, the datapoint values are processed by creative development platform 200 to generate and traffic creatives.

In some embodiments, at least some of the datapoint values are obtained through other mechanisms (e.g., a push or pull data flow model). In some embodiments, API 204 (FIG. 2) provides a set of functions allowing the other applications of creative development platform 200 to access the data. For example, API 204 can provide file input/output functions that cause a file to be copied from one location to another without requiring any user input.

It should be understood that the fields shown in FIGS. 3A, 3B, 3C and 3D are exemplary. Fewer, more, or different fields can be used to generate and traffic a creative.

Referring to FIG. 1, a creative (also sometimes referred to herein interchangeably as "targeted media content") is trafficked over a network (e.g., 102, 104) to targeted devices such as client devices 106.

One example use case involves an external system 114 in communication with creative development platform 200. In this example, the external system 114 is a promoter system communicating a request for a creative. In response to the request, creative development platform 200 obtains one or more specific datapoint values corresponding to an event.

In other embodiments, the datapoint values can be obtained from a website or other database (e.g., of the external system 114). These values are, in turn, used to populate corresponding fields requested by interface 202. The website and database can include structured, unstructured data or a combination of both structured and unstructured data. For example, required information can be obtained using data scraping techniques. For instance, if a promoter system (e.g., external system 114) requests a creative for a particular concert, input interface 202 supplies input fields corresponding to elements of a record. In turn, signals (also referred to interchangeably as datapoint values or parameters) such as a date of a concert, a band name, band artists, images or other media content related to the artists, demographic information about the artist or artist fans, or the like, are retrieved from one or more external systems 114 (e.g., a website or database via an API 204. Creative generator server 108 populates the input fields of the record with the datapoint values automatically. Additional attributes related to the event (e.g., band or particular concert) can be retrieved from plural independent external systems 114 (e.g., databases and/or websites).

Any remaining fields necessary for creative generator platform 200 to generate a creative can be input through a graphical user interface (GUI) via a client device 106.

Figure 3A:
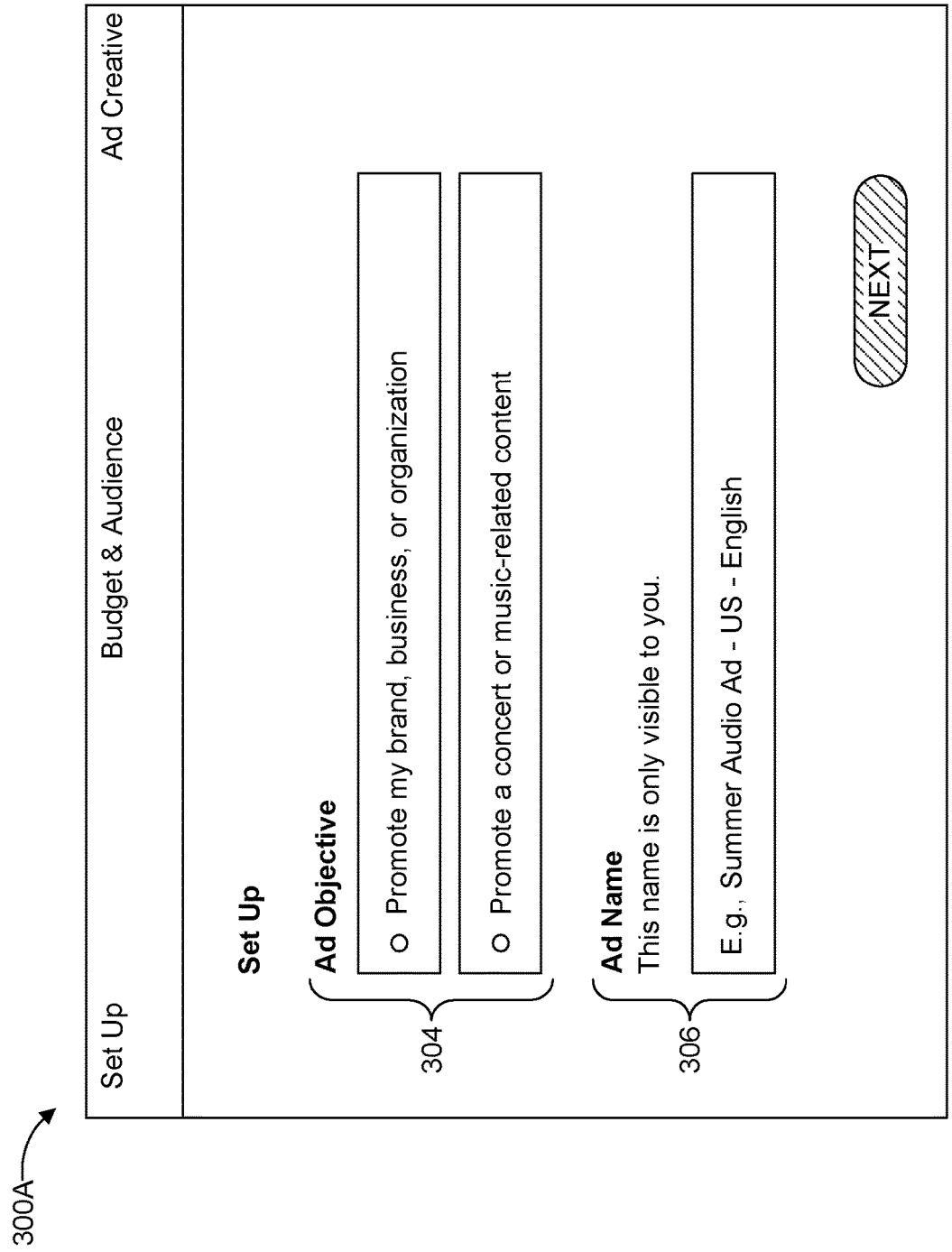
FIG. 3A illustrates a graphical user interface in accordance with an example aspect of the present invention.

FIG. 3A illustrates an example graphical user interface 300A that renders an advertisement ("ad") objective section 304 and an ad name section 306. The ad objective section 304 provides campaign objective fields for obtaining input data corresponding to campaign (e.g., advertising, or promotional) objectives.

It should be understood that an ad objective is a type of campaign objective. Accordingly, other campaign objective types can be used in place of an ad objective and still be within the scope of the invention. Campaign objectives are the goals of advertising or promotional messages. Campaign objectives are used to craft messages, define target audiences and measure results. Example campaign objectives types include:

Sell: to directive sell a product or service.
Demand Generation: to generate demand for an existing product without directly selling it with the ad.
Lead Generation: to identify leads for sales processes.
Engage Target Market: to engage potential customers with information, entertainment and participation with a brand.
Engage Customers: to engage existing customers to improve loyalty and customer lifetime value.
Engaging Influencers: to engage a group that have influence over a product.
Persuade: to persuade audiences about a topic or issue.
Reputation: to build a positive reputation for a firm, brand or product in the eyes of stakeholders.
Inform: to inform customers about products.
Market Research: to collecting information for purposes such as strategy and product development.
Brand Awareness: to increase the number of customers who recognize a brand and associate it with a product category and qualities such as taste or durability.

In the example user interface depicted in FIG. 3A, the campaign objective ("ad objective") field corresponds to selecting an campaign objective relating to promoting a brand, a business, and/or an organization. The other campaign objective field corresponds to selecting a campaign objective relating to promoting a concert or music-related content.

The creative that is generated is based on the type of campaign objective that is selected via the campaign objective ("ad objective") section 304. Graphical user interface 300A also includes an ad name section 306. Ad name section 306 provides fields that can be used to receive ad name information.

FIG. 3B illustrates an example graphical user interface 300B that renders a demographic audience section 310, a listening behavior section 312, and a budget and schedule section 314. The demographic audience section 310 provides fields for obtaining demographics datapoint values relating to one or more groups that a content provider wishes to target. As shown in FIG. 3B, demographics audience section 310 presents fields for obtaining locations data, age data and gender data. The listening behavior section 312 presents fields for obtaining genre information and device operating system platform datapoint values. Budget and schedule section 314 provides fields related to start-end dates/times and total budget. The information collected via the demographic audience section 310, the listening behavior section 312 and the budget and schedule section 314 are used to determine, for example, how often a creative is distributed.

In an example embodiment, the above data can be stored in activity/demographics database 120 (FIG. 1).

Optionally, the budget and schedule section 314 of graphical user interface 300B includes a payment method, or link or portal to effect payment.

Optionally, an input data summary display summary window 316 is provided. In an example embodiment, the input data summary display summary window 316 displays a summary of the locations of targeted listeners (e.g., by country, region, state and/or designated market area (DMA)), as well as age range, gender, and/or platform. Also included in the summary information associated with the cost of the advertisements, active date range and the like.

Figure 3C:
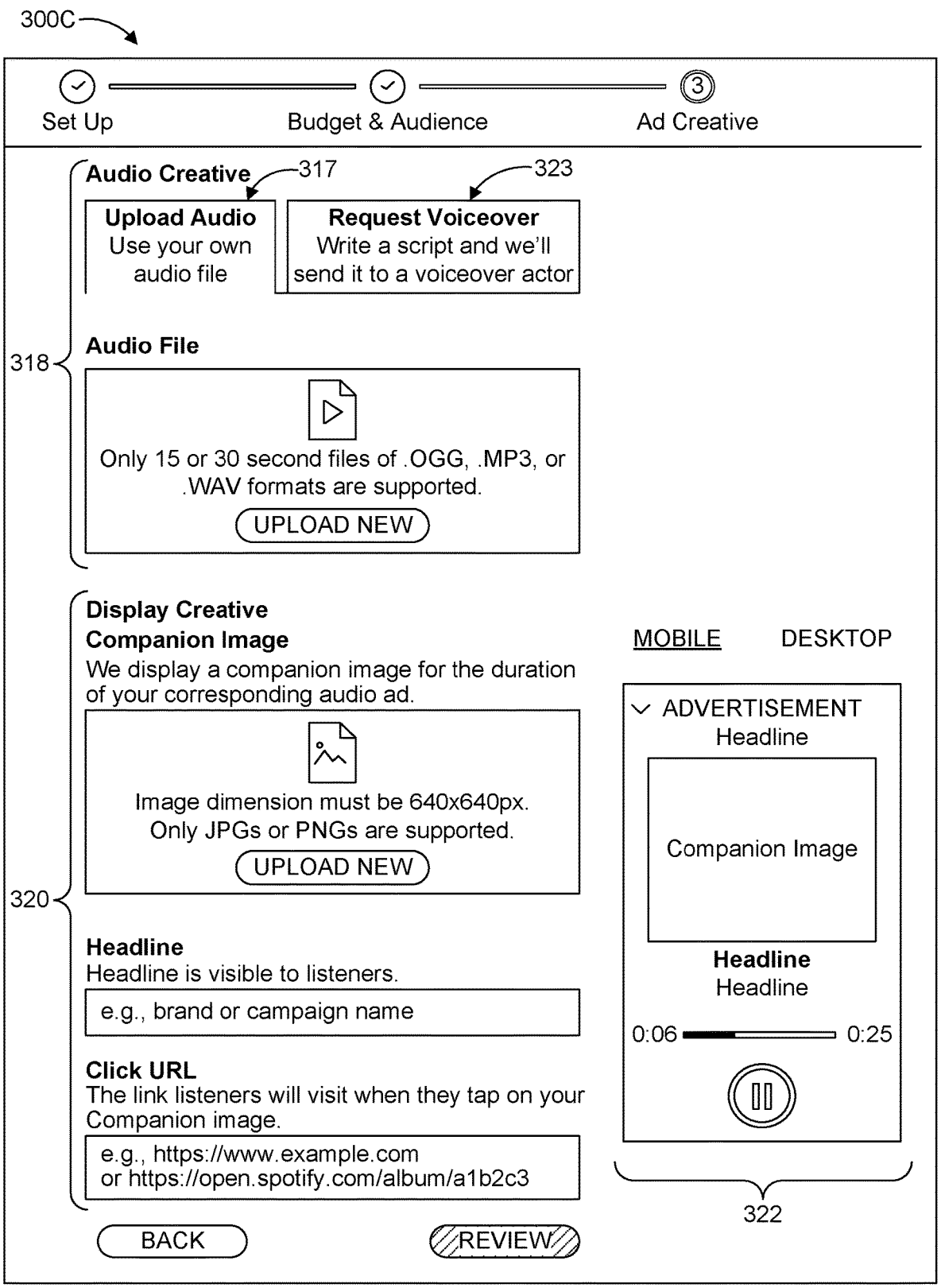
FIG. 3C illustrates a graphical user interface that is used to render fields related to creative media content in accordance with an example aspect of the present invention.

FIG. 3C illustrates a graphical user interface 300C that is used to render fields related to creative media content in accordance with an example aspect of the present invention. In some embodiments, the graphical user interface 300C includes an audio creative section 318 and a display creative section 320. As shown in FIG. 3C, an audio tab 317 allows an operator to select an option to upload an audio file as an audio creative. As described below in connection with FIG. 3D, a voiceover request tab 323 allows an operator to select an option to generate a voiceover file as the audio creative. The voiceover file can, in turn, be stored (e.g., in a store, such as creative store 118, or other store). For convenience, a store that stores a voiceover is referred to herein as a voiceover store. Similarly, a store that stores a music file is referred to herein as a music file store.

The audio creative section 318 and display creative section 320 are used to render fields related to desired media content components of a creative. In an example embodiment audio creative section 318 of the graphical user interface 300C provides a mechanism for uploading one or more audio files, image files and/or video files. For example, a desired audio creative can include an uploaded audio file.

FIG. 3C also illustrates a graphical user interface 300C that can be used to render fields related to a display creative. As shown in FIG. 3C, in the display creative section 320, a companion image, a headline, and a click URL (uniform resource locator) can be input. Yet another section of the graphical user interface 300C can be constructed to provide an advertisement display preview 322 for both mobile devices and desktop computers.

In some embodiments the audio creative section can include an option to automatically select an audio file. An example implementation of an automated search for ad background music is described below in connection with FIG. 9. The creative development platform 200, for example, can be configured to obtain a media content item that is acoustically similar to a query track.

Figure 3D:
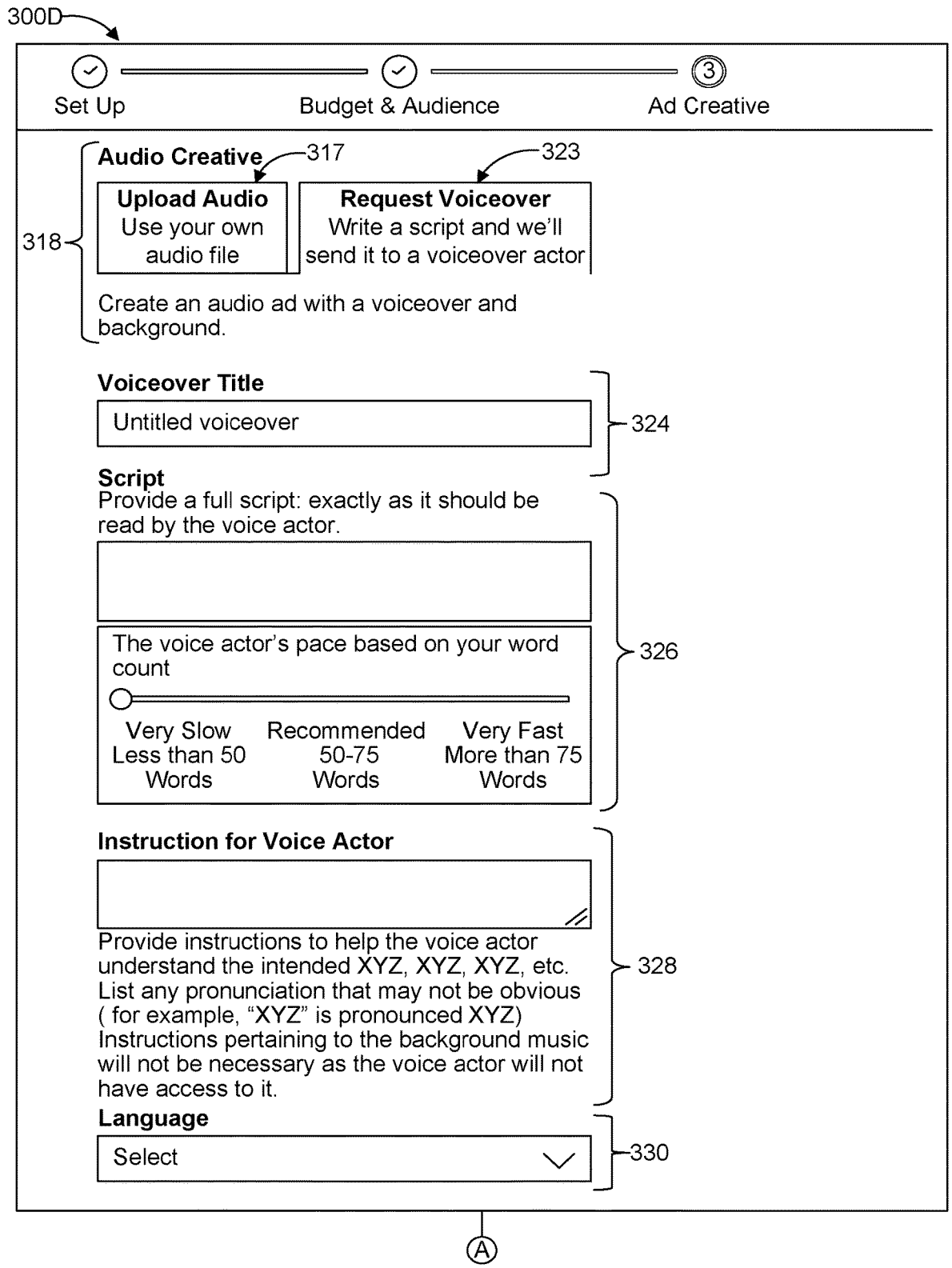
FIG. 3D illustrates a graphical user interface that is used to render fields related to creative voiceover content in accordance with an example aspect of the present invention.
Figure 3D:
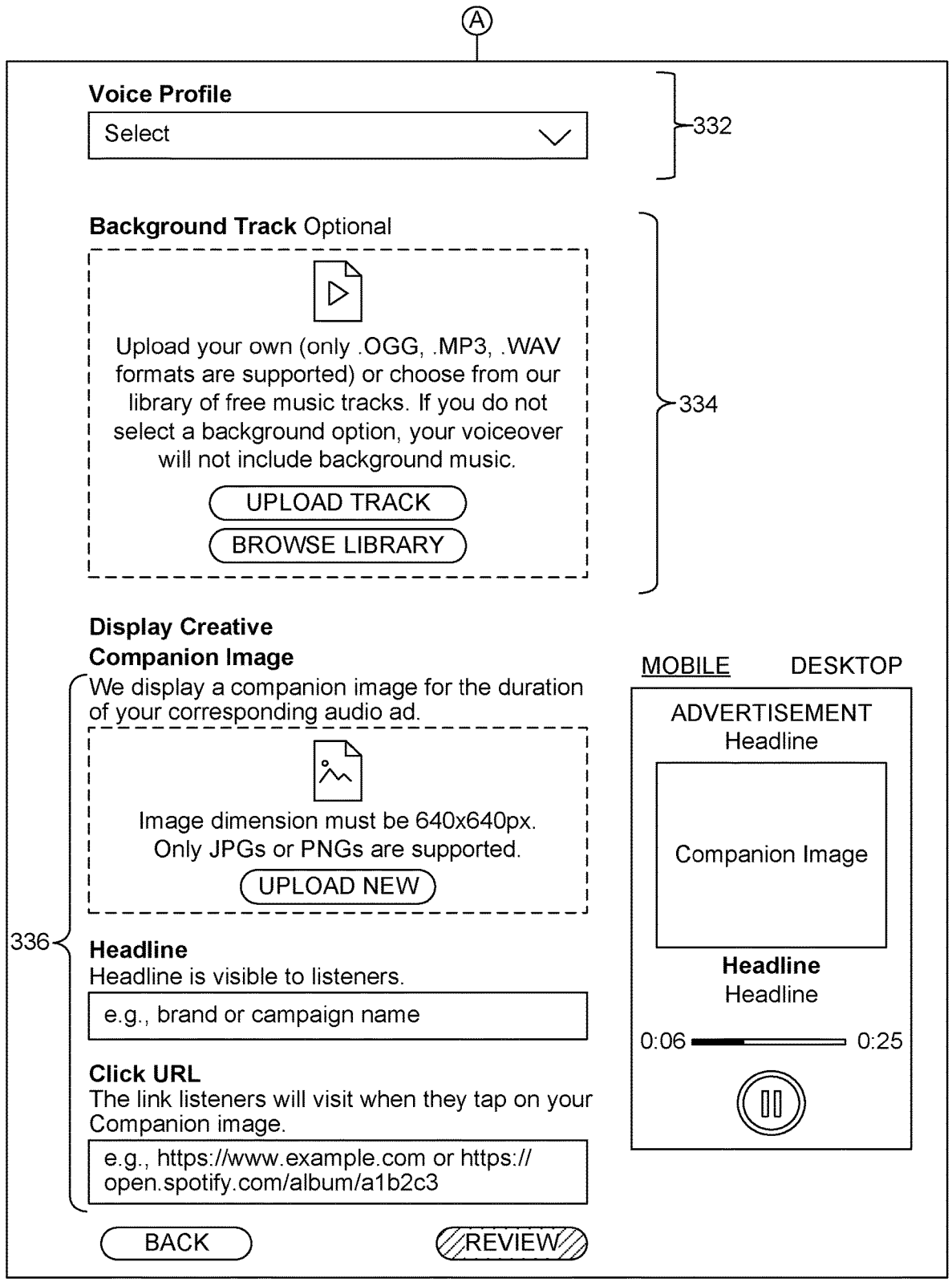

FIG. 3D illustrates a graphical user interface 300D that is used to render fields related to a creative voiceover in accordance with an example aspect of the present invention. In some embodiments, the creative can be include a voiceover. As shown in FIG. 3D, a voiceover request tab 323 that allows an operator to select an option to generate a script for a voiceover. In some embodiments the voiceover can be mixed with an audio file discussed above in connection with FIG. 3D, as described below in more detail in connection with FIG. 10. Interface 300D includes voiceover title section 324, a script section 326, a voiceover instruction section 328, a language section 330, a voice profile section 332, a background track section 334, and a display creative section 336. Voiceover title section 324, script section 326, voiceover instruction section 328, a language section 330, a voice profile section 332, background track section 334, and a display creative section 336.

Voiceover input data enables an operator the ability to write a script to be used as a voiceover. Voiceover title section 324 provides an input field that receives a title of the voiceover. Script section 326 provides script input fields that are used to obtain a script to be read by a voiceover mechanism. The voiceover mechanism can be a technological voiceover mechanism such as a text to speech audio mechanism. In some embodiments, the input that is received by script section 326 are communicated over a network to another system that presents the script to a voiceover actor who reads the script according to the parameters input through the user interfaces described in connection with FIGS. 3A, 3B, 3C and 3D. In some embodiments, voiceover script input fields of script section 326 include a pace for the voiceover script to be spoken. As shown in FIG. 3D, the language input field of language section 330 is a pulldown menu which allows an operator to select the particular language to be used. Voiceover profile section 332 allows voiceover profiles to be presaved. A background track can also be uploaded or selected through background track section 334. Display creative section 336 includes a headline field and click URL field. Headline field and click URL field are used to receive input data related to a companion image, a headline, and a click URL.

In some embodiments the audio creative section can include an option to automatically select a voiceover file. An example implementation of an automated search for ad background music is described below in connection with FIGS. 10 and 11. The creative development platform 200, for example, can be configured to dynamically generate a voiceover or portions thereof.

In other embodiments, these media content components operate as seed components that creative development platform 200 uses to select other similar or otherwise more appropriate components to be included in the creative that is generated. In other embodiments, these media content components are images, audio or video content that correspond to the artist, event, band, or the like, that can be used to provide signals sufficient for creative development platform 200 to generate a creative. For example, if an image of an artist is uploaded, creative development platform 200 can be used to search external systems 114 for any information about the artist such as the dates of future concerts. In turn, creative development platform 200 can perform natural language processing and execute natural language understanding algorithms to determine other signals that can be used to automatically generate a creative. Such media content can be stored, for example in media object store 116 (FIG. 1).

Example Creative Generation Processes

Figure 4:
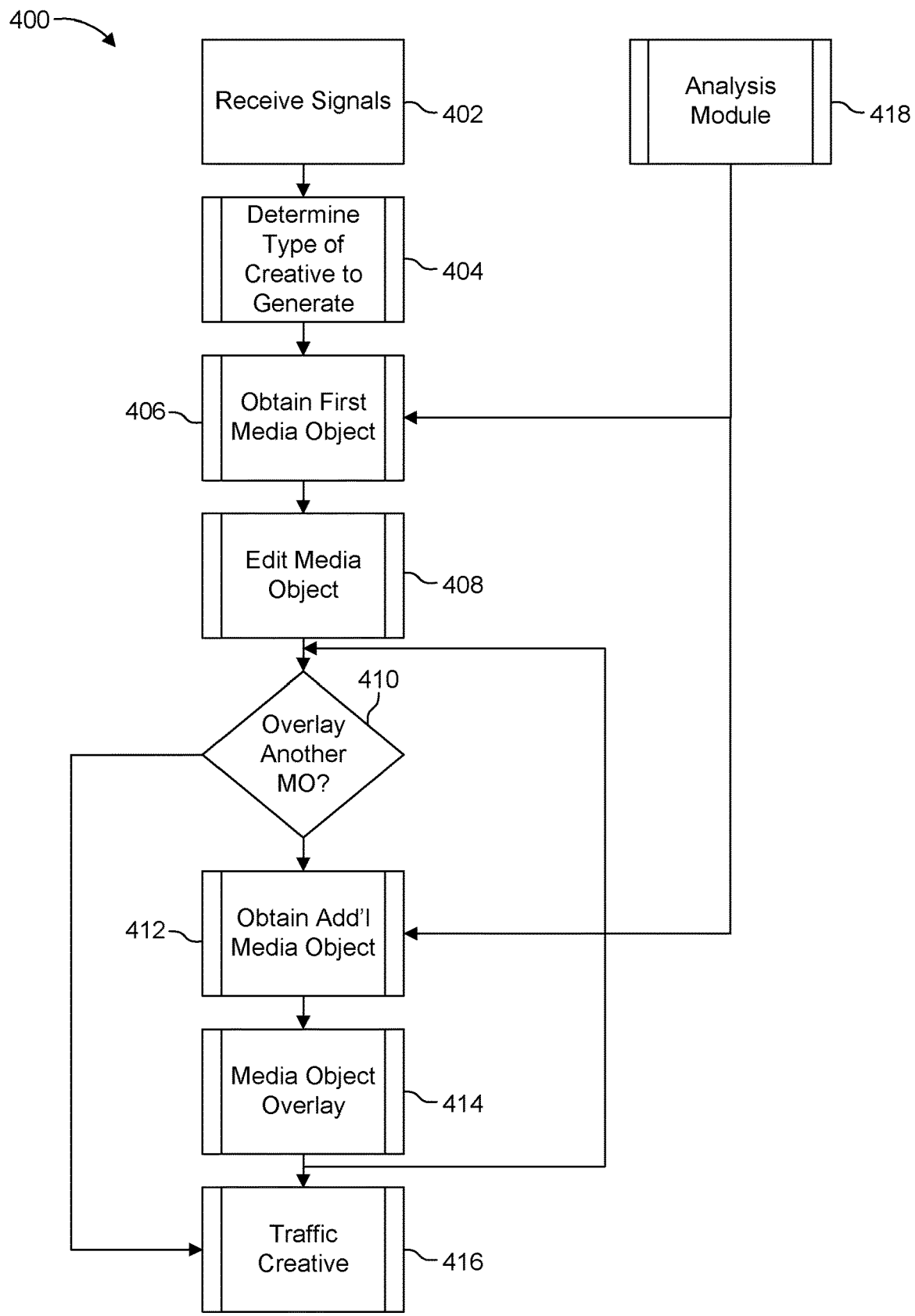
FIG. 4 depicts an example process for generating a creative in accordance with an example aspect of the present invention.

FIG. 4 depicts an example process executed by one or more processors of creative development platform 200 for generating a creative in accordance with an example aspect of the present invention. Initially, at block 402, the creative generator server 108 of FIG. 1 receives datapoint values (as noted above, also referred to as input data or signals) that contain information used to generate and traffic the creative. In one embodiment, an identifier associated with a promoter system, a list of dates and/or a value corresponding to a budget for a creative are used to initiate the creative generation and trafficking process are provided by these signals. For convenience, this data is collectively referred to as initial creative parameter values. These initial creative parameter values are used to obtain any additional signals necessary to generate and traffic targeted media content.

In block 404, a determination is made as to the type of creative that should be generated: e.g., an audio, video or text creative. In the following example, an audio-based creative is generated. This determination can be made, for example, based on the playback capabilities particular client devices 106 that will receive the creative. For example a vehicle appliance may only receive audio, whereas a mobile phone can receive audio and visual content.

In block 406 a first media object (e.g., in the form of a media file) or a preexisting media object is obtained and uploaded through interface 202.

In one embodiment, a determination is made as to whether the first media object for the creative should be generated based on a pre-existing media object described above (also referred to as a first preexisting media object) or whether a different media object (also referred to as a first new media object) should be generated.

The first media object can be obtained automatically based on predefined criteria, by comparing its metadata to one or more signals received through input interface 202 and selecting the best match. Now known or future developed mechanisms for selecting the best match can be used.

In turn, in block 408, the first media object is edited, based on, for example, specific targeting and scheduling criteria. Depending on the target device, additional text can be inserted. For example if a device can receive feedback through sensors (e.g., accelerometer, microphone, and the like), then the script may be edited to receive a response from the device. In some embodiments, depending on the action taken, the script can dynamically change. It should be understood that, as used herein, a script for a voiceover can be composed of several script elements.

A determination is made in block 410 as to whether an additional media object should be overlaid on top of the media content in the first media object. If so, in block 412, an additional media object is obtained. Particularly, in block 412, a determination is made as to whether the additional media object should be a preexisting media object (also referred to as an additional preexisting media object) or a different media object (also referred to as an additional new media object).

In one example use case, the first (preexisting or new) media object is in the form of an audio file and the additional (preexisting or new) media object is the form of a voiceover audio file. The first media object and additional media object are processed so the additional media object content is overlaid on top of the first media object content (e.g., voiceover content is overlaid on top of audio content such as a music track), as shown in block 414. Additional editing is performed if necessary as well.

In one embodiment, the additional editing is performed automatically.

In another embodiment, the additional editing is performed partially automatically.

In yet another embodiment, the editing is performed manually through input interface 202 of the creative development platform 200.

If a determination is made at block 410 that the additional media object (e.g., such as a voiceover) should be created, then creative development platform 200 determines an additional media object name for the additional media file (e.g., the name of the voiceover). In an example embodiment, this name will also be reflected as a project name and a campaign name. In the case where the additional media file is a voiceover, platform 100 receives a script for the voiceover. The script can be text-to-speech translated by processor (e.g., a text-to-speech processor). Optionally, platform 100 translates, using a translation module (not shown), the voiceover to one or more languages based on corresponding signals, e.g., the concert is in France, therefore the language is French. If any of the signals received through interface 102 indicate the content of the additional media file should be generated or manipulated a certain way, then the additional media file is processed accordingly, e.g., such that certain terms are stated with inflection or emphasis points, tone, or other information. In an optional embodiment the signals received by input interface 102 provide sufficient information to determine the demographic attributes of the additional media object, e.g., the language or general tone of the voiceover.

As described below in connection with FIGS. 11 and 12, the script for the voiceover can be generated dynamically. Thus in some embodiments, instead of obtaining a voiceover file, voiceover script sections are combined dynamically.

In some examples embodiments, a method, a system, an apparatus and a computer-readable medium are provided for analyzing previously-consumed creatives to generate a model that can be used to generate or otherwise configure the attributes of a creatives (e.g., the audio file, the voiceover file, the companion image, etc.). In an example embodiment, previously-consumed creatives are analyzed to determine which attributes of the creatives are most effective in, for example, driving action.

Attribute categories include objective, tone, music, assets, brand visibility, creative metadata, call-to-action categories, and the like. The objective may be what the new creative is targeted to. The tone may be the sound with respect to its pitch, quality and strength. Music may be the audio content that is included in the creative. Assets may be certain content that may be included in the creative, such as a voiceover script. Brand visibility may be how visible a brand is in the creative. Creative metadata may include various information about the creative. A call-to-action may be information included in the creative that requests an action to be performed by the user. The various attribute categories can be broken down into additional attributes.

The attributes are, in turn, fed to a processor which executes an algorithm that causes the processor to generate a model that is used to generate new creatives.

An analysis module 418 can be used to process previously-consumed creatives (e.g., creatives that have been consumed during a certain time period). In one example implementation, analysis module 418 identifies attributes in the creatives by using automatic identification processes, such as natural language processing (NPL), audio processing tools, and video processing tools that analyze the speech content and audio attributes of a creative. NPL and audio processing tools can be used, for example, to recognize the speech in a previously-consumed creative to recognize certain phrases, artists, tone attributes, and the like. Visual recognition, text recognition, audio recognition and the like also may be used to determine or infer the attributes of the previously-consumed creatives. The attributes obtained using these techniques can be input into, for example, a table in a database.

Analysis module 418 can also be used to determine what extent the attributes of previously-consumed creatives had an effect on consumers of the previously-consumed creatives. Analysis module 418 may input the detected information into a machine-learning algorithm that is used to train a model that predicts attributes of creatives that correspond to particular signal(s).

In one example use case, a particular signal may indicate the target consumer is over a certain age or a member of a certain demographic. A particular phrase or script that has been predicted to be most effective for this age group or demographic (e.g., that will translate to calls-to-action) will be obtained and used to create a new creative. In other words, the analysis module 418 predicts the effectiveness. Effectiveness may be measured by a quantifiable measure, for example, a click-through rate, sell-through rate, a referral rate, brand recall, or some combination of these or other measures. For example, it may be determined that a first script is most effective for a first type of concert promotion while a second script is more effective for a second type of concert promotion.

The analysis module 418 can thus build a model (also referred to as a machine-learning model) that is used to predict the attributes of a new creative.

A database may also be used to store measured statistics for the previously-consumed creatives, such as demographics statistics as shown in FIG. 1 (user activity/demographics DB 120). These demographics statistics relate a creative to which audience might be relevant for the creative. For example, classical music concert promoters may be interested in listeners over a predetermined age. Game company promoters are interested in gamers.

In some embodiments, both background music and the words a voiceover mechanism (or artist) is speaking are provided automatically and the audio levels are set when mixing the two. The machine automates the processes typically performed by the mixing engineer allowing for the scalable creation of creatives containing audio. In some examples, given a voiceover audio file (e.g., a first media object) and a separate background music file (e.g., a second media object), an algorithm is executed by an audio generator 206, a voiceover request processor 208, a mixer 210, and a voiceover generation service 212 that collectively generate a voiceover mixed with background music in an automated fashion. This takes into account music lead-in time, volume normalizing, and balance between voiceover and background music. Parameters of the processing chain are estimated from the audio content, including the equalization parameters (estimated using the audio's frequency content) and the music lead-in time (using estimates of the background music's onset patterns.)

Voiceover Workflow Definitions for Voiceover Approval Process

FIG. 5 illustrates an exemplary voiceover workflow definition for a voiceover approval process which can be executed with other workflows asynchronously. Referring again to FIG. 2, this process can be performed automatically by, for example, voiceover request processor 208. In block 502, the process waits for a voiceover. Once the voiceover is received, in block 504, the voiceover is reviewed and a determination is made as to whether the voiceover is approved or rejected. If a determination is made in block 504 that the voiceover is rejected, a new voiceover project is generated as shown in block 506. If a determination is made in block 504 that the voiceover is approved, then in block 508 the voiceover is mixed by mixer 210 and in block 510 trafficking and performance tracking processor 214 and creative distribution server 216 traffic the voiceover to targeted devices (e.g., client devices 106) on a network such as wireless network 104.

FIG. 6 illustrates another exemplary voiceover workflow definition for a voiceover approval process which can be executed by voiceover request processor 208 and mixer 210 with other workflows asynchronously. In block 602, the process waits for a voiceover. Once the voiceover is received, in block 604 the voiceover is queued for review. At block 606 the voiceover is mixed and a preview creative is generated. A review of the preview creative is performed at block 608 and a determination is made as to whether the preview creative is rejected or approved. If rejected, then a determination is made at block 610 as to the reason for the rejection. For example, if the reason is because the voiceover does not meet a particular criteria thereby indicating the voiceover is bad, then at block 612 the voiceover request is regenerated and the flow returns to block 602. If the determination made at block 610 that the mixing process does not meet a predetermined criteria, then this mix failure is logged and a message is communicated to the appropriate component associated with the project indicating this, as shown in block 614. For example, a message providing the log can be transmitted to the party responsible for the project. If a determination is made at block 608 that the preview creative is approved, then the preview creative is approved by an approval process, as shown 616. Once approved, at block 618 the final mix is trafficked, by creative distribution server 216 of FIG. 1, for example, at the direction of the trafficking and performance tracking processor 214.

Content can be stored in content provider database 222. As will be described below in more detail a targeting processor 218 operates to determine target audiences. In some embodiments, the targeting processor 218 operates in conjunction with an audience generation service 220 which in turn is supplied content provided by a content provider whose content is stored in content provider DB 222.

Block 504 of FIG. 5 and block 616 of FIG. 6 will now be described in more detail with reference to FIG. 2. Audio data that includes speech may be transcribed by a voice transcriber which operates under the control of the voiceover generation service 212 of FIG. 2 using a language model. The transcription may be provided to a voiceover review processor (not shown) which operates under the control of the voiceover generation service 212 of FIG. 2. In turn, voice over review processor may provide feedback on the transcription. In some embodiments, the language model may be updated based at least in part on the feedback. The feedback from the voiceover review processor may include, for example, an affirmation of the transcription; a disapproval of the transcription; a correction to the transcription; a selection of an alternate transcription result; or any other kind of response.

An automated grammar generator (not shown) also under the control of the voiceover generation service 212 of FIG. 2 can be used to correct, revise or replace the proposed voiceover. In some embodiments, the automated grammar generator identifies one or more parts of the voiceover suitable for processing into a natural language expression. The natural language expression is an expression which a person might use to refer to the segment. The automatic grammar generator generates one or more phrases from the segment, each of the one or more phrases corresponding to or capable of it being processed into a natural language expression or utterance suitable for referencing the text or speech segment. Noun phrases and verb phrases and other syntactic structures are identified in the speech or text segment, and modified to produce typical natural language expressions or utterances a user might employ to reference a segment. Verbs in verb phrases may be modified in order to provide further natural language expressions or utterances for use in the grammar. The natural language expressions thus generated may be included in grammars or language models to produce models for recognition using an automatic speech recognizer in a spoken language interface.

Search for Ad background Music By Track

In some embodiments, a determination is made as to which media object from a library of media objects is used for a creative. In an example embodiment, the workflows are defined by audio generator 206 of FIG. 1. In one example embodiment, an interface (e.g., input interface 202 of FIG. 1) receives a query that, in turn, causes a search engine to search a library. The search engine can be contained within audio generator 206 or communicatively coupled to audio generator 206 via, for example, input interface 202 and/or API 204.

The library can be searched by, for example, using a query song as explained below.

Figure 9:
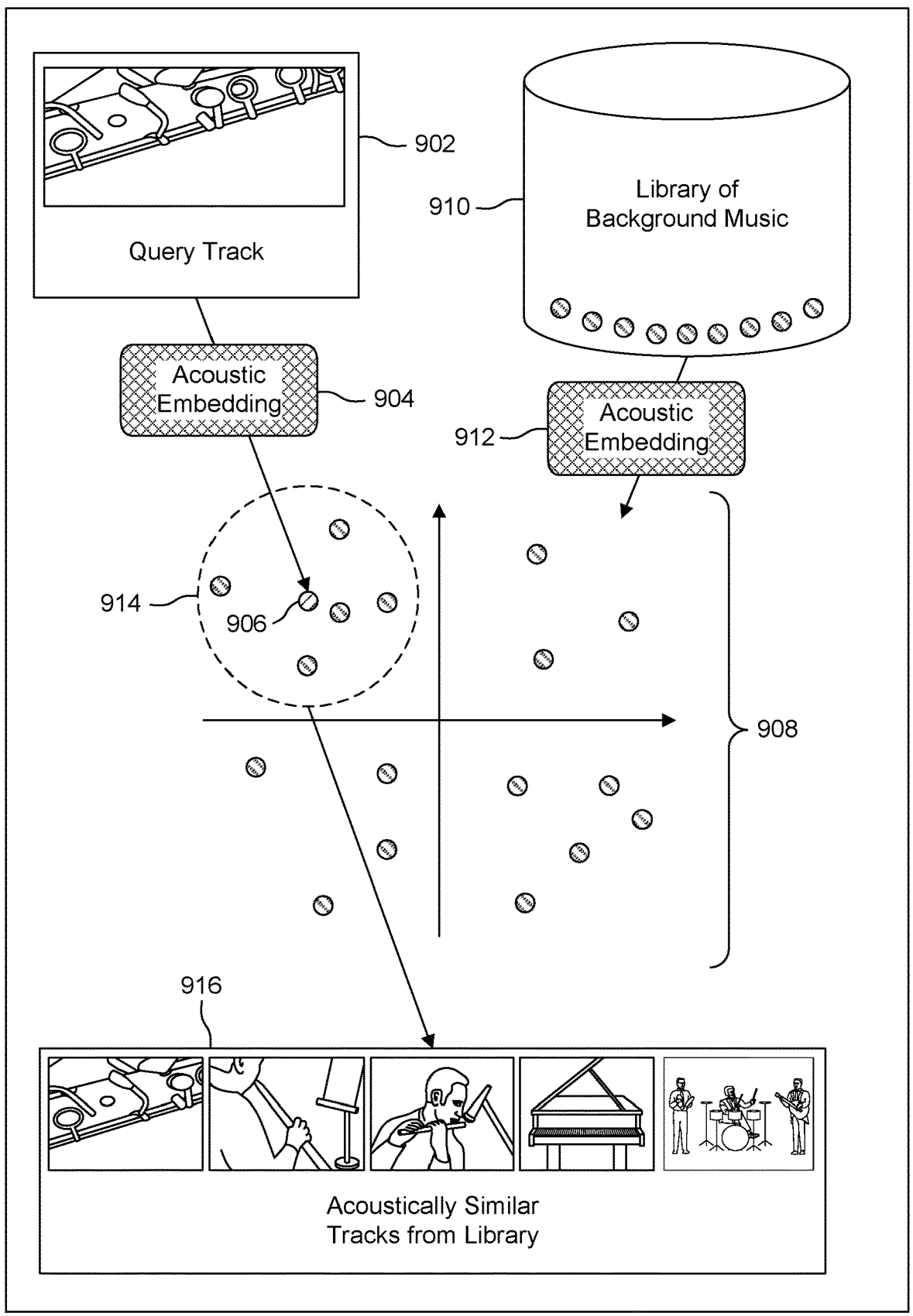
FIG. 9 illustrates a process and embedding space in accordance with an aspect of the present invention.

FIG. 9 illustrates a process and embedding space in accordance with an aspect of the present invention. Generally, the query process is accomplished by using acoustic embeddings. Acoustic embeddings are derived directly from audio content.

The acoustic embeddings are used to map each track in a library of tracks to a point in an embedding space. In the example embodiment shown in FIG. 9, the acoustic embedding space 908 is derived directly from the audio content attributes of a library of tracks 910 (e.g., background music). Specifically, acoustic embeddings of the audio content of a library of tracks is performed to map each track in a library of tracks to points in the embedding space 908 based on plural attributes of the track, as represented by block 912. An acoustic embedding is also computed for a query track within the embedding space.

N-tracks from the library of tracks that are nearest in the embedding space are determined and, in some embodiments, ranked by distance to the query track.

With reference to both FIGS. 2 and 9, input data defining one or more properties are received, for example, through input interface 202 of FIG. 2, and used to obtain acoustically similar media content that is, in turn, used for a creative, for example by mixing the media content with a voiceover. In this example, the input data received through input interface 202 is a query track 902. This input data can be, for example, in the form of a name of a song or track identifier (ID). the input data is used to obtain the features of the query track. The features of the query track, in turn, are used to generate an acoustic embedding of the query track 904. The acoustic embedding of the query track is mapped to a point 906 (also referred to herein as a query track embedding space point) in the embedding space 908 of the library of tracks.

Acoustically similar tracks 914, particularly embedding points representing tracks from the library of tracks 910 (e.g., N-tracks from the library of tracks 910, where N is an integer) that are nearest in the embedding space to the point within the embedding space representing the query track are, in turn, returned as represented by block 916. The returned tracks can be ranked by distance to the query track. The returned tracks can be returned to other workflows within system 200 or to an external system, e.g., via interface 202.

In one embodiment, a constant-Q transform is performed on the query track 904 to generate a time-frequency representation of the audio content of the query track 904. Next, a learned convolution function is performed on the resulting constant-Q transform to project the constant-Q transform into a smaller space. The weights and convolutions are learned to place an attribute of the track that is the same as a corresponding attribute of another track from the library of tracks 910 close together and further apart if they are different.

In one example embodiment, principal component analysis (PCA) is used to convert the 1024-dimentional vector into a set of values of linearly uncorrelated variables called principal components (or sometimes, principal modes of variation). The number of principal components is less than or equal to the smaller of the number of original variables or the number of observations. In this case, the 1024-dimensional vector is mapped to an 8-dimensional vector.

In one example embodiment, a 1024-dimensional vector is generated for every song in a database. The 1024-dimensional vector is multiplied by a convolutional matrix that recombines the elements that are similar (i.e., elements that have a high covariance are preserved.

In another embodiment, a portion of a track can be used as the query input. For example, a section of a track can be provided through input interface 102 instead of the entire track (or pointer to the entire track, such as a track ID).

The above described mechanism for searching for ad background music by a track is performed by one or more processors referred to herein as a background music search processor. Particularly, when the functions described above are performed by the background music search processor, the background music search processor performs the methods described herein related to searching for ad background music.

Automated Ad Voiceover Mixing

Another aspect of the present invention relates to systems, methods and computer program products that automate the processes typically performed by a mixing engineer, thereby allowing for the scalable creation of audio ads. With reference to FIG. 2, the components and processes that will now be described can be included in, for example, audio generator 206, voiceover request processor 208, mixer 210 and/or voiceover generation service 212.

Generally, given a voiceover audio file and a separate background music file, an algorithm executed by a least one processor causes the processor(s) to mix the voiceover with the background music in an automated fashion. This takes into account music lead-in time, volume normalizing, and balance between voiceover and background music. Parameters of the processing chain are estimated from the audio content, including the equalization parameters (estimated using the audio's frequency content) and the music lead-in time (using estimates of the onset patterns of background music.).

Figure 10:
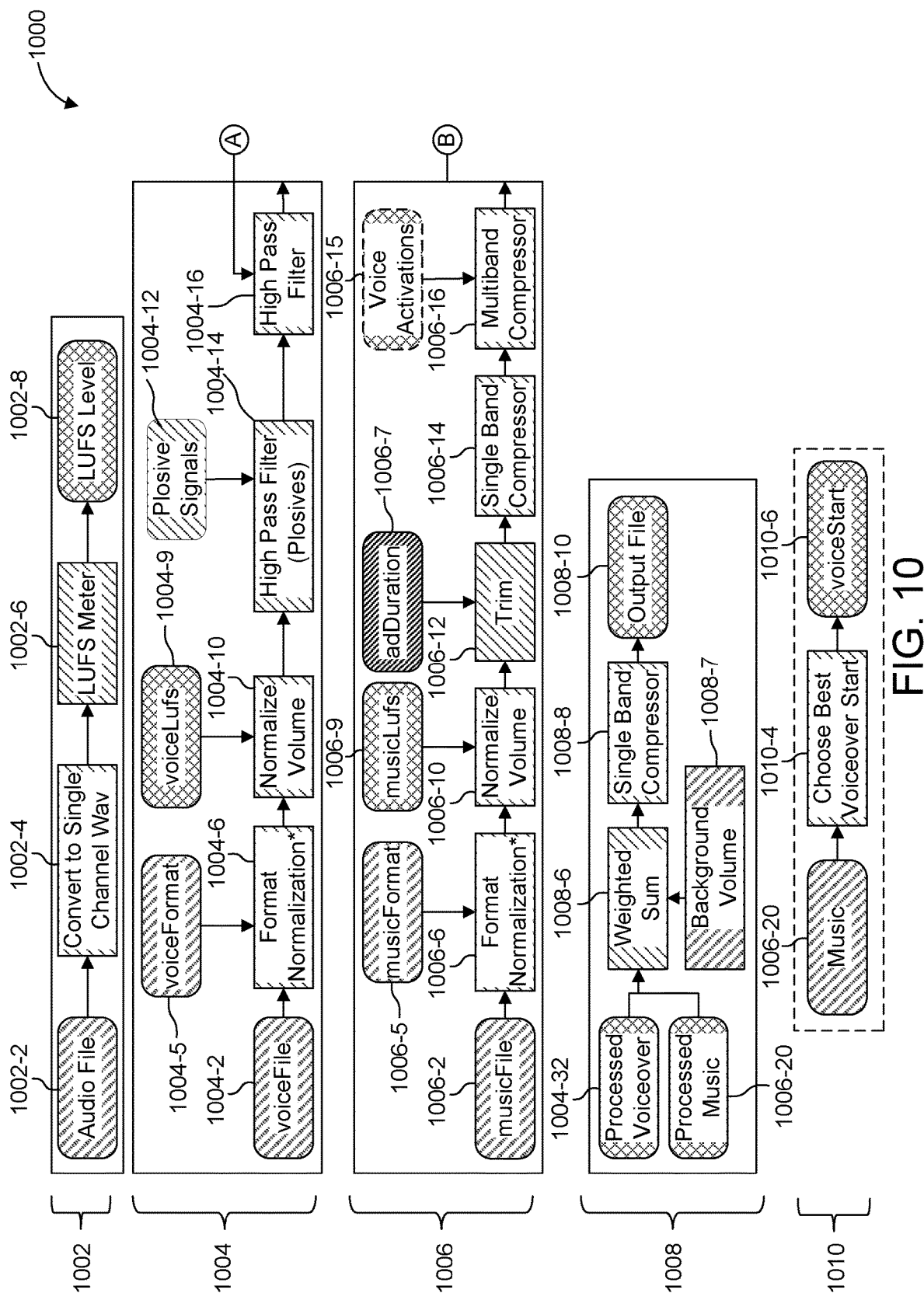
FIG. 10 illustrates a diagram of a mixing system in accordance with an example aspect of the present invention.
Figure 10:
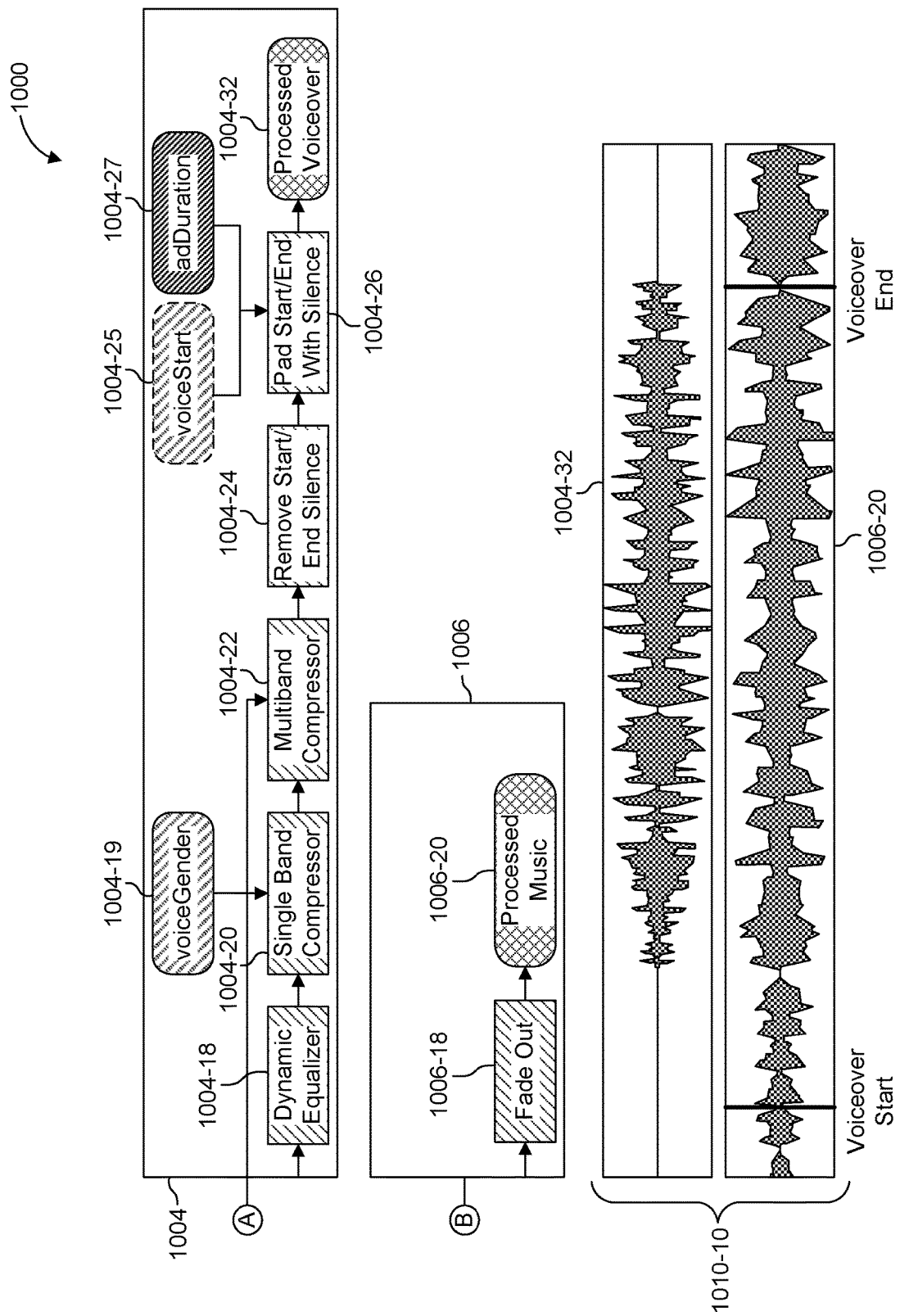

FIG. 10 is a diagram of a mixing system 1000 according to an example embodiment. Generally, a volume subsystem 1002 standardizes the volume (also referred to as loudness normalization) of an audio file 1002-2 so that the volume of the audio file 1002-2 is the same across a collection of other recordings. After the audio file 1002-2 is converted to the appropriate format by channel converter 1002-4, e.g., to a single channel Waveform Audio File Format (WAV) file, a loudness units relative to full scale (LUFs) measurement is taken by a LUFs meter 1002-6. A gain level controller 1002-8 ("LUFS Level") adjusts the gain. For example, gain level controller 1002-8 reduces the gain if the audio file 1002-2 is too loud. If, on the other hand the level is too soft, the peak level of the audio file 1002-2 is measured by LUFs meter 1002-6 to determine whether the gain can be raised by gain level controller 1002-8 without causing distortion. If the track is breaching a distortion threshold, then the file is compressed or limited as needed by gain level controller 1002-8.

Generally, a voice processor subsystem 1004 processes a voice file 1004-2. Initially, the format of voice file 1004-2 is normalized to a standard sample rate bit depth wave file based on a predetermined voice format stored in voiceFormat store 1004-5 by format normalizer 1004-6. The volume is then normalized by a volume normalizer 1004-10 by using a measurement of the LUFs of the voice file obtained from voiceLufs store 1004-9, and raising or lowering the peaks (i.e., normalizing volume). The resulting, normalized voice file is then processed by a plosives detector 1004-12 to identify when plosives occur. Plosives are a bassy, often distorted sound, that results when an air blast from the mouth goes into a microphone. The most common source is the letter P, which is why plosives are sometimes generically referred to as P-Pops. While the P sound is the most common sound that causes a plosive, there are plenty of other sounds that cause similar problems, such as the letter B.

Plosives are detected by measuring the energy level of the voice file within predetermined low or high frequency ranges. If energy exists in the low or high frequency ranges in a particular distribution that exceed a predetermined threshold, the regions in which such plosives are detected are filtered out, thereby substantially eliminating unwanted plosives. In one embodiment, the high pass filter 1004-14 (or first high pass filter 1004-14) only high pass filters the regions in which plosives have been detected. Another high pass filter 1004-16 (or second high pass filter 1004-16) is used to reduce any low frequency hum that might be in the recording. In one embodiment, the parameter of the second high pass filter 1004-16 is set based on a fundamental frequency of a voice indicating the gender of the speaker. A voice gender parameter that indicates the gender of the speaker can be preset in memory, such as voiceGender store 1004-19. Alternatively, the pitch of the voice overall is estimated and an appropriate parameter is set. That way a label (e.g., gender) is unnecessary the parameter stores (i.e., represents) a broader fundamental voice frequency.

Next the normalized and filtered voice file is processed by a dynamic equalizer 1004-18. Dynamic equalizer 1004-18 contains a statistical model that has been pretrained by obtaining the statistics of the discrete spectrum of plural, preferably well-mastered, voices. The statistics include, for example, a mean and variance of the discrete spectrum. If any part of a spectrum of a new recording is outside of, for example one standard deviation of the mean of the set of recordings, then that part of the spectrum (e.g., a particular frequency band) is adjusted. In other words, the spectrum is readjusted so that it falls within the statistical range of the voices that are known to be properly recorded.

A single band compressor 1004-20 controls erratic volume (e.g., unequal and/or uneven audio volume levels) changes based on a voice fundamental frequency. In one embodiment, the voice fundamental frequency can be a set parameter.

A multiband compressor 1004-22 detects and adjusts any variance in each frequency band. In some embodiments, the multiband compressor 1004-22 divides the frequency spectrum into different sections, or bands, so that each has its own unique compression settings to mimic a good voice recording. In one embodiment multiband compressor 1004-22 looks at the variance of each frequency band and adjusts the variance in the voice recording to be similar to a target (e.g., defined by a parameter in voiceGender store 1004-19 that is based on a database of voice recordings that are well mastered). For example, the mean and variance over a set of good recordings is determined. If a particular section is heavily compressed it will have a low variance in a particular frequency band. Looking at the statistics of the variance in each frequency band, the multiband compressor 1004-22 is running on a particular frequency range and looking at the variability against the well mastered voice recordings. Depending on the audio file, a particular frequency band might be compressed or expanded to make it match the well mastered voice recordings defined in voiceGender store 1004-19.

A silence removal component 1004-24 removes any silence at the start or end of the voice file.

A pad silence component 1004-26 pads the voice file with silence at the start or end of the voice file so that the voice file fits within a desired start time stored in voiceStart store 1004-25 (e.g., ½ second) and duration stored in adDuration store 1004-27 (e.g., 30 seconds). The result is a processed voiceover file 1004-32 that is stored in, for example, a voiceover store.

In some embodiments, the voiceover is further processed to determine where in the file voice is present. This information is stored in a voice activations store 1006-15 described in more detail below.

Music processor 1006 processes a music file 1006-2. Initially, a format normalizer component 1006-6 normalizes the format of music file 1006-2 to a standard sample rate bit depth wave file based on a predetermined music format stored in musicFormat store 1006-5. The volume is then normalized by a volume normalizer 1006-10 by using a measurement of the LUFs of the music file obtained from voice voiceLufs store 1006-9, and raising or lowering the peaks (i.e., normalizing volume). A trimming component 1006-12 trims the music file according to a predetermined duration (e.g., ad duration) stored in adDuration store 1006-7. Alternatively, trimming component 1006-12 trims the music file by an amount received through an interface, such as input interface 202 of FIG. 2. This input can be received via client device 106 or an external system 114.

In some embodiments, the amount of the music file 1006-2 that is trimmed is determined based on selected acoustic feature(s). For example, if the desired acoustic features for an advertisement is a guitar solo without a singing voice, an acoustic-feature search component (not shown) is used to detect such acoustic features from one or more music files stored in a music file database. If the desired acoustic-features are located in a music file, then that music file is used as music file 1006-2, and the section of music file 1006-2 containing the guitar solo and no singing determines is extracted and the amount trimming (also referred to as trimming parameters). Conventional or future developed methods of detecting such detected acoustic features can be used.

To increase the LUFS, without changing the sound and balance of the mix a gain plugin can be inserted at the start of the chain. Compression, limiting or harmonic distortion can also be added to increase the loudness.

A single band compressor 1006-14 controls erratic volume changes.

The frequencies of voice that make the voice intelligible tend to be in the higher frequency range that humans can hear. Depending on the music in the music file 1006-2, the music may clash with a voice, such as the voice in processed voiceover file 1004-32. To cause the voice in processed voiceover file 1004-32 to be more intelligible, a multiband compressor 1006-16 in music processor 1006 is used to compress the top (i.e., predetermined) frequency range of the music file 1006-2 (e.g., 6000-20,000 Hz), such that it is active when a voice is speaking. By doing so, multiband compressor 1006-16 creates a space in a high range that permits the processed voice in processed voiceover file 1004-32 to be more clearly understood. Voice activations store 1006-15 stores a curve corresponding to the voice in processed voiceover file 1004-32. In some example embodiments the curve corresponds to when a voice is present in processed voiceover file 1004-32.

In one example embodiment, the curve is determined by measuring the energy in the audio signals that make up the processed voiceover file 1004-32. A low-pass filter filters the squared energy of the audio signals. A logarithmic compressor compresses the filtered, squared-energy to force the range to close to between 0-1 and anything above a predetermined threshold (e.g., 0.5) is considered to be active (i.e., voice is present).

A fade controller 1006-18 performs fade-in and fade-out of the processed music file within a predetermined timeline. The result is a processed music file 1006-20, that is stored in a store such as media object store 116 or creative store 118. For convenience, a store that stores a music file is referred to as a voiceover store.

A mixing processor subsystem 1008 receives the processed voiceover file 1004-32 and the processed music file 1006-20 and further processes them to set a target weighting between the loudness of the processed music in process music file 1006-20 and the voice in processed voiceover file 1004-32. This is possible because both the voice and music have been normalized to a specific loudness volume as described above. A predetermined background volume parameter stored in background volume store 1008-7 indicates the amount of relative volume between the normalized voice and music files (e.g., the background volume is 30% of the loudness of the voiceover volume). Weighted sum component 1008-6 adjusts the volume of processed voiceover file 1004-32 and processed music file 1006-20 according to the background volume parameter and adds them together. Single band compressor 1008-8 in mixing processor subsystem 1008, in turn, flattens the volume out to ensure that the combination of the content of the processed voiceover file 1004-32 and processed music file 1006-20 are uniform. The output file 1008-10 is the result of the process performed by mixing processor subsystem 1008.

Voiceover processor subsystem 1010 determines the voiceover start time (voiceStart) which is stored in voice start time store 1010-6. The voiceover start time, voiceStart, stored in voiceover start time store 1010-6 can be predetermined (e.g., 0.5 seconds).

Depending on the length of the voiceover in processed voiceover file 1004-32, it may be desirable to shift the start time of the voiceover within the processed music in processed music file 1006-20. For example, it may be desirable to start the voiceover right away or, alternatively, at the end of the first measure or beat of the music. Voiceover timing 1010-10 shows an example voiceover start and an example voiceover end. In some embodiments, the voiceover start type is determined by performing an analysis of the music file. In one example embodiments, the energy of the background music is measured and the voiceover start time is chosen according to whether the energy meets predetermined tolerance. In some example embodiments, a beat detector (not shown) executing a beat detection algorithm can be used to determine the timing of the processed music file (e.g., the beats of the music). The start time can then be determined based on which beat the voiceover should start (e.g., the first beat).

Asynchronous Execution

Before becoming a targeted media content file, the corresponding input data is processed by the various components of mixing described above. As shown above with respect to FIG. 10, each task has may have a respective flow and the different sequential steps of the respective flow need to be performed on the input data. In some embodiments, for example, the volume subsystem 1002, the voice processor subsystem 1004, the music processor 1006, and the mixing processor subsystem 1008 are performed asynchronously.

Example aspects provide a definition of the workflow and workers that perform the various steps within the workflow. These aspects provide recovery mechanisms, retry mechanisms, and notification mechanisms.

In some embodiments, at least a portion of the steps performed by the various functions can be performed asynchronously. As such, one function flow is not waiting for the result of another function flow. Once a series of steps are initiated those steps are performed in the background by so-called workers. A view of the output (i.e., a view of a media object) is returned via an interface. Optionally a view of the output is returned via an interface at each step. If necessary, a notification is issued (e.g., via an interface) requesting additional input. The individual flows are performed asynchronously, while responses back through, for example, the interface are synchronous.

The example embodiments execute a number of flows depending on input. For example various types of input can be received through the interface. Depending on the type of input, a different workflow is performed. For example, if a media content file or location of a media content file (e.g., a background track) is input, one workflow is performed. If no such input is received, then another workflow is performed, for example, which either requests or otherwise obtains a different type of input.

In an example embodiment, logic determines, based on some combination of inputs, a particular flow that should be implemented. Each flow returns a result (e.g., a return value such as a Boolean value). If each step is successful and each worker returns a success message, the manager for the entire flow or pipeline knows to step the media object (e.g., an audio advertisement to be transmitted) to its next successful state based on the workflow definition. If a failure during the flow occurs, knows how to handle the failure or retry a sequence of steps based on the workflow or pipeline definition.

In an example embodiment, each independent routine, e.g., waiting for a voiceover, generating a new voiceover project, mixing, and trafficking are workers in the pipeline manager. Every worker has a defined logic that it performs. A mixing worker, for example, calls scripts that perform certain functionality. If the mixing worker performs the scripts successfully, the mixing worker causes a mixed media object (e.g., audio advertisement) to be stored in memory so that it can, in turn, be accessed for other steps and returns a message indicating that it executed its flow successfully. If for example, the mixing worker performs a script that fails, then the mixing worker returns a message or value indicating that it has failed.

Every worker also has its own definition for what is successful. In the case of a mixing worker, for example, if an internal process in the mixing stage has determined that an internal stage has failed (e.g., a voiceover is silent indicating that the voiceover mixing has failed), then the mixing worker returns a message indicating that the mixing stage has failed. Every worker has its own definition of what is successful and what is a failure.

Example embodiments described herein can also provide automated routing and failure (e.g., retries) and recovery handling (e.g., fallback). In addition, the embodiments allow the various functions to be modular and for different workflows to be defined. If one worker fails, the logic for how it would fallback is dependent on the type failure. Each worker can thus be performed more than one time safely.

In an exemplary embodiment, the individual components may not be part of a sequential workflow. In other words, they do not know that they are going to flow at all, they just know that they might being called. This allows the manager to be untethered to any particular workflow.

Pipeline manager is given all of the workers and workflow definitions. The pipeline manager, using the workflow definitions executes the workers in sequence and manages predefined successes and failures.

Figure 7:
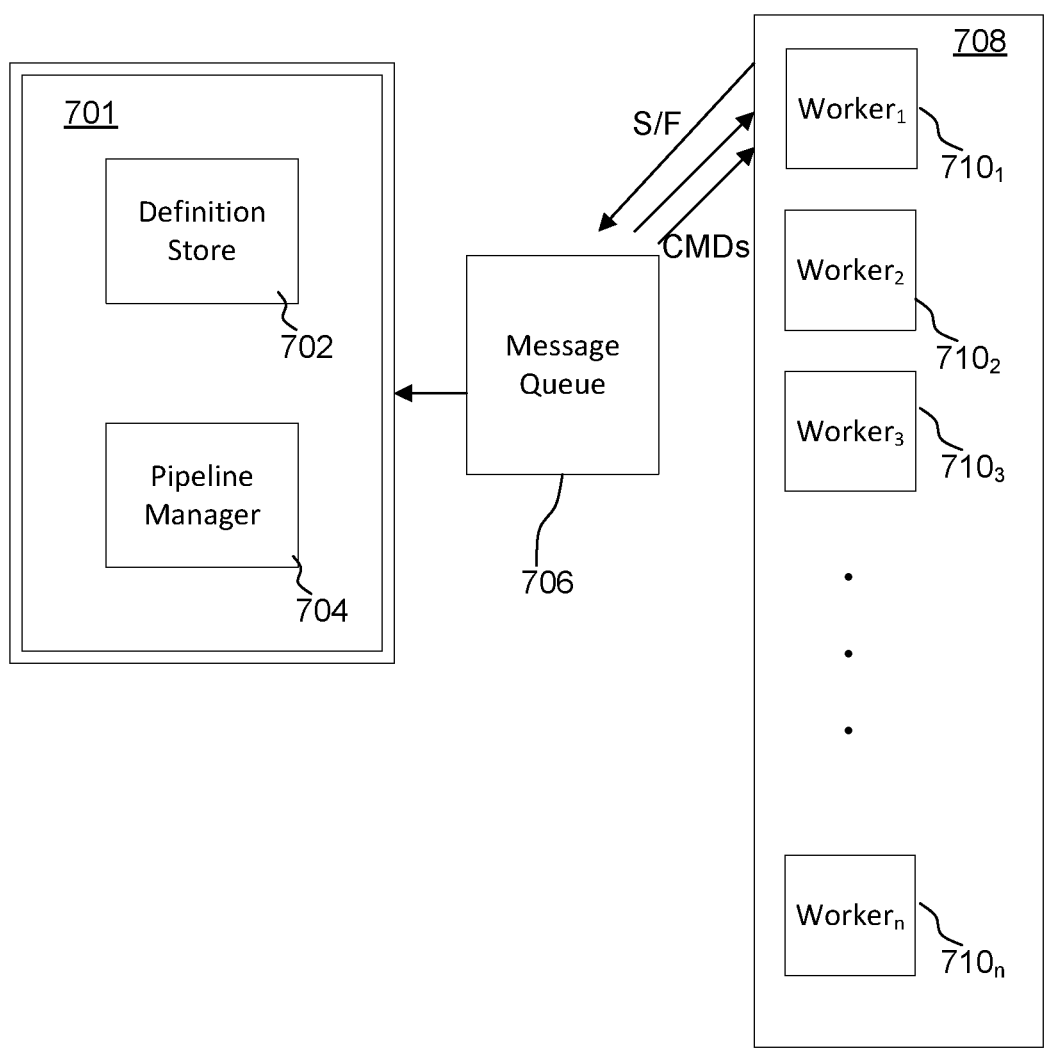
FIG. 7 is a diagram illustrating a system for automating the generation of a creative in accordance with an example embodiment of the present invention.

FIG. 7 is a diagram illustrating a system for automating the generation of a creative in accordance with an example embodiment of the present invention. A service 701 contains a workflow definition store 702 and a pipeline manager 704. A worker store 708 containing workers $710_1$, $710_2$, $710_3$, . . . , $710_n$ (e.g., Worker$_1$, Worker$_2$, Worker$_3$, . . . , Worker$_n$)(each individually and collectively 710) resides independently from service 701. A message queue 706 that performs routing is communicatively coupled to the service 701 and the worker store 708. Commands (CMDs) are communicated by the message queue 706 to the workers 710 to instruct the workers 710 to perform predetermined tasks. In return, the workers 710 communicate back to the pipeline manager 704 via message queue 706 a message indicating whether the task they performed was a success or failure (S/F). In turn, the pipeline manager 704 determines the next step based on a workflow definition stored in workflow definition store 702. In one example embodiment, the pipeline manager 704 does not hold the logic, but rather communicate through the message queue 706 to instruct the workers to perform tasks. In this embodiment at least one custom workflow definition is used. In addition, asynchronous execution via the message queue is performed.

In an example embodiment, at least a portion of the metadata used to generate a creative is stored in a database prior to the creative generation process. Metadata includes assets that are available to each worker. There can be exceptions. For example, additional information can be added by a workflow. As part of the idempotent nature of the workers, for example, if one encounters a field that requires input and the information is not necessary, the worker will bypass (e.g., ignore) that missing field. Thus, with exceptions, metadata is available at the start of the creative process.

Figure 8:
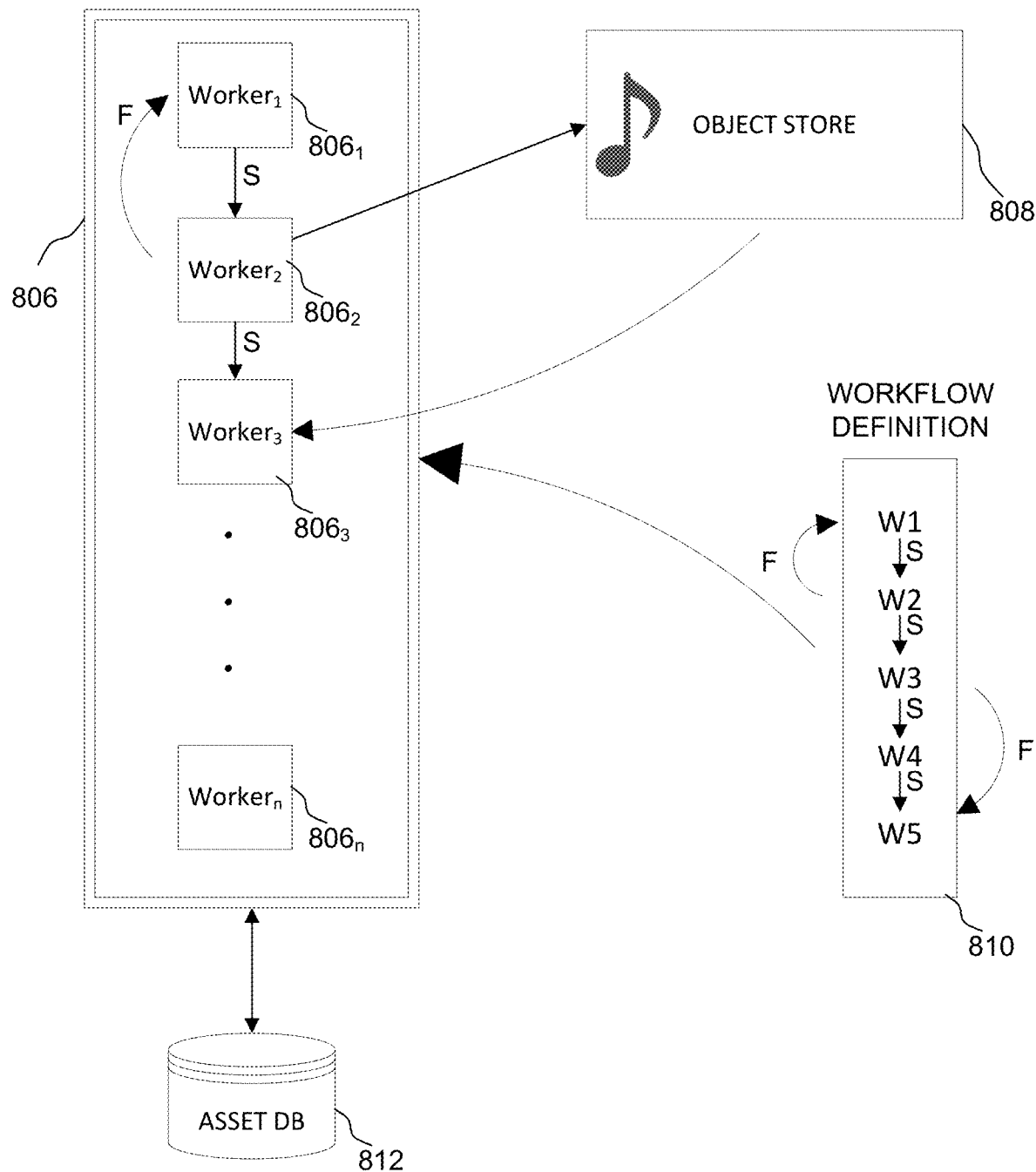
FIG. 8 is a diagram illustrating a system for automating the generation of a creative in accordance with an example embodiment of the present invention.

FIG. 8 is a diagram illustrating a system for automating the generation of a creative in accordance with an example embodiment of the present invention. Referring to FIG. 8, assets can be stored in asset database 812 and made available to the workers $806_1$, $806_2$, $806_3$, . . . , $806_n$ (e.g., Worker$_1$, Worker$_2$, Worker$_3$, . . . , Worker$_n$)(each individually and collectively 806). In addition predefined component identifiers can be prestored in an object store 808. Asset database 812 (also referred to as asset store 812) can be configured to have plural buckets that store media objects. A workflow definition 810 is called to execute a task.

In an example implementation, a mixing workflow mixes a component identifier that has been predefined and stored in object store 808 with a media object stored in asset database 812 and made available to each worker 806 (e.g., Worker$_1$, Worker$_2$, Worker$_2$, . . . Worker$_n$) in case a worker needs to use it. For example, if a worker is in charge of mixing an audio component identifier stored in object store 808 with a media object, the mixing workflow can mix the audio component identifier and the media object and store in asset database 812 (e.g., in a bucket) and make available to the workers the mix of the media object and the component identifier.

In one embodiment, a failure mode cause creative development platform 200 to repeat workflows. This is accomplished by making each workflow idempotent. An idempotent workflow is a workflow that produces the same results if executed once or multiple times. This configuration avoids the need to undo any of the work that has already been done by the workflows in the event of a failure. In other words, an operation can be repeated or retried as often as necessary without causing unintended effects while avoiding the need to keep track of whether the operation was already performed or not.

A workflow definition 810 can be performed more than one time until the correct results are achieved. An attempt can be made to, for example, to perform a workflow definition 810 that traffics a creative more than one time without actually releasing the creative. Similarly, an attempt to perform a workflow that calculates or communicates billing information can be performed more than one time. In yet another aspect, an attempt to perform a workflow that mixes audio more than one time can be performed.

The example pipeline flow definition code can be stored in memory. The pipeline manager has a pool of threads that are available to perform work and available internally. The pipeline manager manages execution of plural threads that communicate messages to a corresponding worker. The worker returns a result. Based on the result, the manager references the applicable workflow definition, choose the next step and passes the work to the next worker via another thread. In an example embodiment, this is accomplished by placing messages onto the message queue. The system is thus asynchronous. The message queue allows the system to be scalable and distributable. Thus several systems of workers can be created independently thereby eliminating the need to limit the workers to a predetermined number threads (e.g., a initiate command that initiates the generation of creative, a boost command that causes creatives associated with a predetermined object to be generated).

Personalized Creatives with Call to Action

Figure 11:
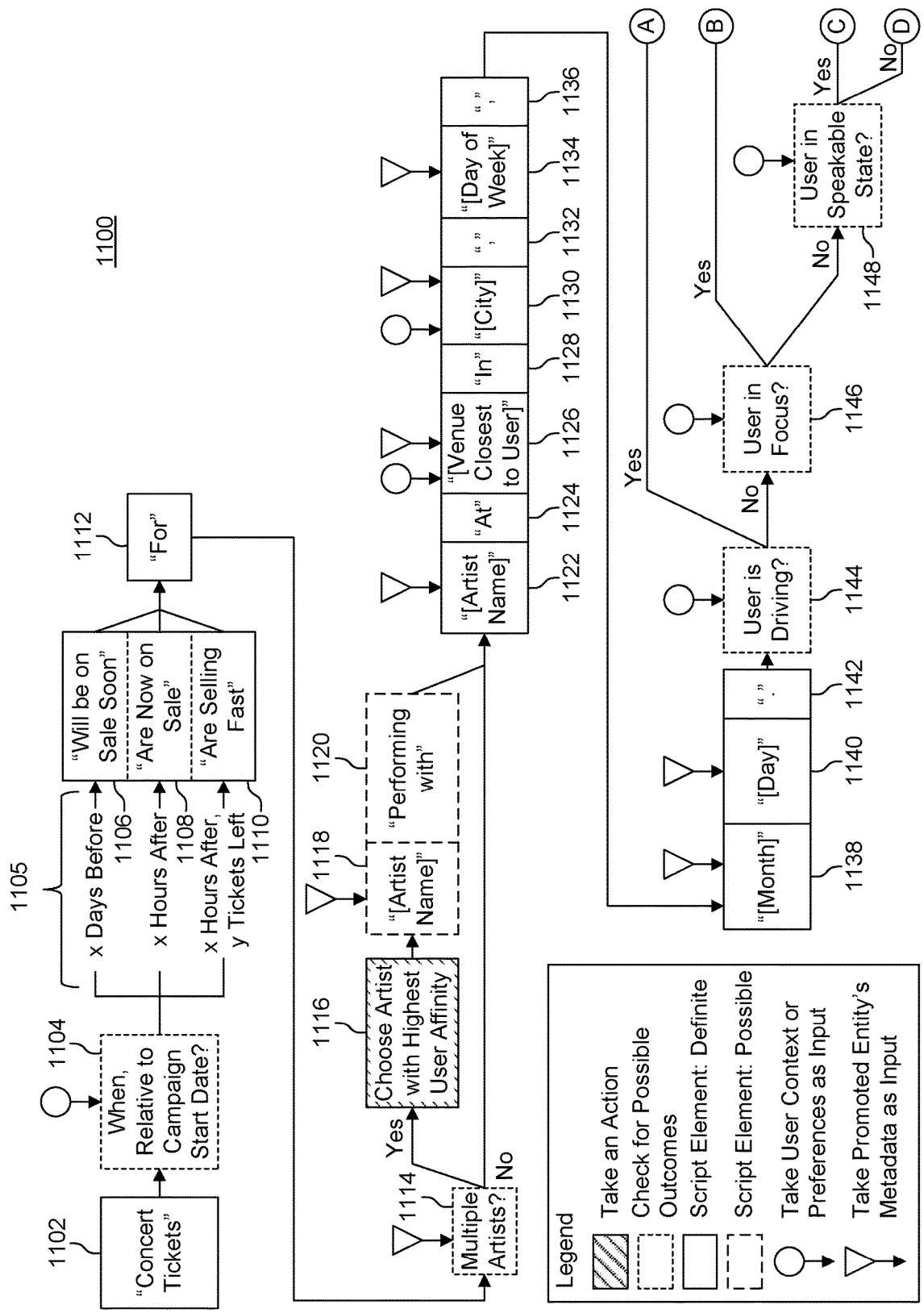
FIG. 11 illustrates a dynamic call to action process in accordance with an example aspect of the present invention.
Figure 11:
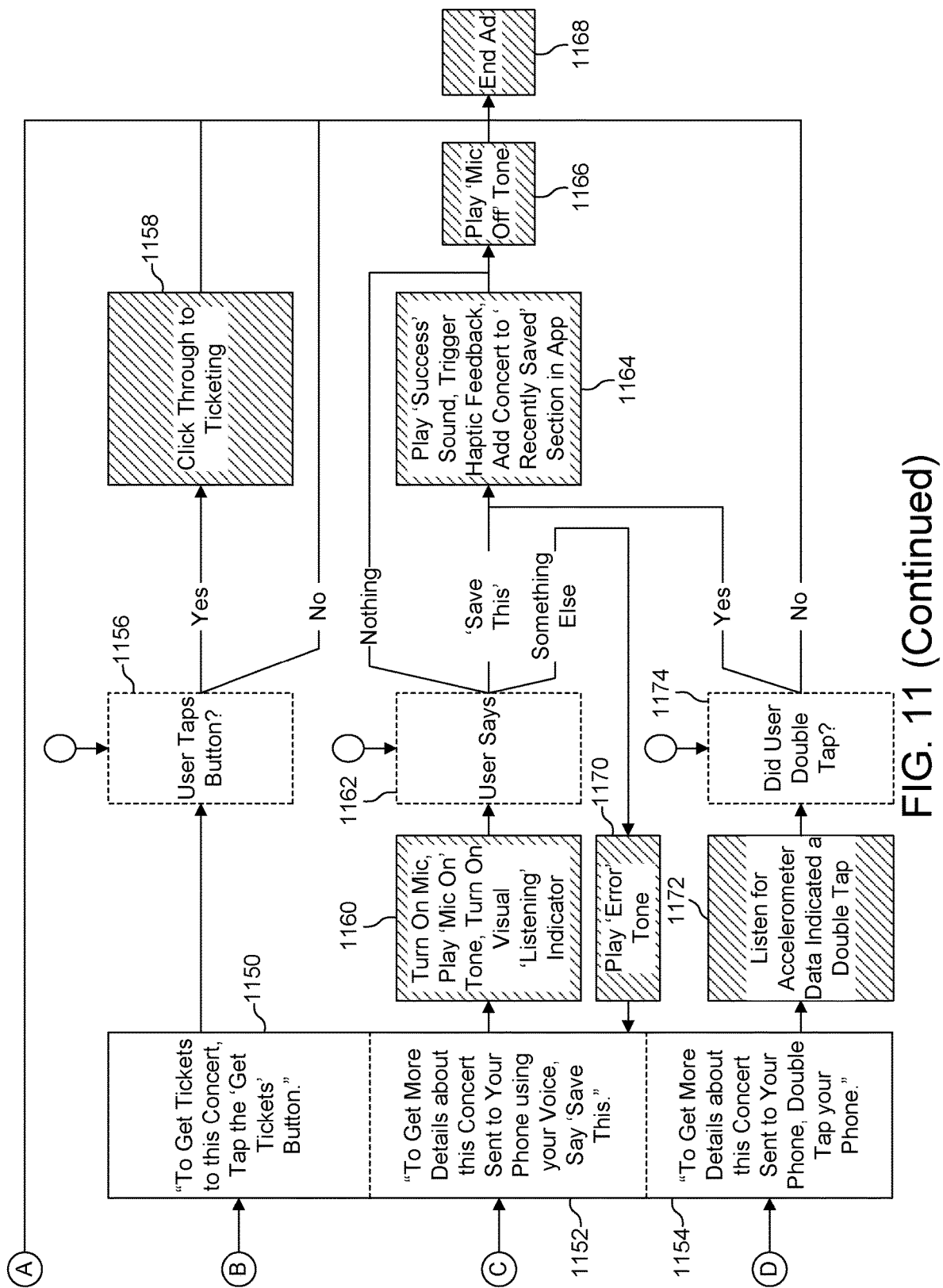

FIG. 11 illustrates a dynamic call to action process 1100 in accordance with an example embodiment. Generally, dynamic call to action process 1100 involves generating scripts that are information and/or calls for action. In the case where the scripts are calls for action the dynamic call to action process causes a device to expect input through its input interface. The input and calls for action are generated according to information associated with a promoted entity (e.g., datapoint values received from a promoter via external system 114, datapoint values associated with a user (e.g., received from a service storing data associated with the user), and datapoint values associated with a device operated by the user (e.g., device 106). A promoted entity is an entity that is the subject of advertising or promotion, where advertising generally refers to controlled, messages in the media, while promotion includes marketing activities, such as sales or sponsorships. Example promoted entities include, a brand, a business, an organization, a product, a place, a concert, media content (audio content, video content, image content, games, podcasts, books, etc.), and the like.

As shown in the legend of FIG. 11, dynamic call to action process 1100 includes (1) taking an action, (2) checking for possible outcomes, (3) supplying script elements that are definite (referred to as definite script elements), (4) supplying script elements that are possible (referred to as possible script elements), (5) taking user context or preferences as input and (6) taking a promoted entities metadata as input.

The example implementation depicted in FIG. 11 relates to an objective involving a concert promotion. The script elements (e.g., definite script elements and possible script elements) are text that are presented (e.g., played back) through a device 106 using text to speech processing. In an example embodiment at least one or more of the script elements are mixed with other audio files (e.g., background music) using the mixing system 1000 described above in connection with FIG. 10 by storing the text to voice generated during the execution of process 1100 as a file. An audio file (e.g., background music) can be obtained as described above in connection with FIG. 9.

In some embodiments, the script elements can be streamed. Thus instead of storing them as a file (e.g., a voiceover file), the script elements can be retrieved in realtime.

Definite script elements can be fixed or variable. A definite script element that is fixed is referred to as a fixed definite script element. A definite script element that is variable is referred to as a variable definite script element. A fixed definite script element is a script element that is in every script for a particular campaign objective (e.g., as selected by a promoter using interface 300A discussed above in connection with FIG. 3A). Example fixed definite script elements are depicted in FIG. 11 according to the legend "Script Element: Definite" and as shown in FIG. 11 have a term or phrase within quotes.

For example, a fixed definite script element for an ad object corresponding to a concert will always include the phrase "Concert Tickets" (block 1102), the term "For" (block 1112), the term "At" (block 1124), and the term "In" (block 1128). Other fixed definite script elements include punctuation such as a comma "," (block 1132, block 1136), a period (block 1142), a question mark "?" (not shown), and the like, which when converted to speech cause the speech synthesizer to pause or presented (e.g., played back) with inflection or emphasis points, tone, or other information.

A variable definite script element is a script element that is included in a script and includes content that can vary. Thus, like a fixed definite script element, a variable definite script element is a script element that is always played for a particular campaign objective (e.g., as selected by a promoter using interface 300A discussed above in connection with FIG. 3A) but the value of the variable definite script element will change. For example, a variable definite script element for an ad object corresponding to a concert can be set to always include the name of the main artists (block 1122), the name of the venue closest to a user (block 1126), the name of the city in which the venue resides (block 1130), day of the week (block 1134), among others, but those script elements will always vary. Example variable definite script elements are depicted in FIG. 11 according to the legend as "Script Element: Definite" and as shown in FIG. 11 have an attribute of the script element (i.e., the value) within quotes and brackets.

As explained above, a fixed definite script element is used in all scripts generated for a particular type of objective (e.g., a concert will always include the phrase "Concert tickets" as shown in block 1102). Such fixed definite script elements can be prestored stored in a memory store. Optionally, such fixed definite script elements can be prestored stored in a memory store that is relatively faster than memory stores that store other data (e.g., variable fixed definite script elements) to increase the speed at which fixed definite script elements can be accessed.

Possible script elements also can be fixed or variable. A possible script element that is fixed is referred to as a fixed possible script element. A possible script element that is variable is referred to as a variable possible script element. Unlike definite script elements, a possible script element is selected based on one or more factors and is not necessarily included in an advertisement creative. In some embodiments, factors that determine whether a possible script element is used include information related to the end user (e.g., user context or user preferences). In some embodiments, factors that determine whether a possible script element is used include information related to the ad campaign. In some embodiments, factors that determine whether a possible script element is used include information related to the device that will receive the ad creative.

In some embodiments, there exist multiple options for either a definite script element or a possible script element. A definite script element that is selectable is referred to as a selectable definite script element. For a given situation, a selection of one selectable definite script elements is made. Depending on when the relative campaign start date is, for example, one of multiple selectable definite script elements can be selected (e.g., selectable (fixed) definite script elements 1106, 1108 or 1110). Thus if a definite script element is one of several possible definite script elements, then it is referred to as a selectable definite script element (e.g., a first selectable definite script element, a second selectable definite script element, and so on).

In some embodiments, selectable definite script elements can be fixed or variable. A selectable definite script element that is fixed is referred to as a selectable fixed definite script element. A selectable definite script element that is variable is referred to as a selectable variable definite script element. Example fixed definite script elements that are selectable (i.e., selectable fixed definite script elements) are depicted in FIG. 11 according to the legend "Script Element: Definite" and where the selectable fixed definite script elements follow a procedure that checks for possible outcomes and causes the process to select a selectable fixed definite script element based on the outcome.

Example procedures that check for possible outcomes include a decision function and a data retrieval function. An example data retrieval function is shown in FIG. 11 as data retrieval function 1104. Data retrieval function 1104 particularly retrieves data corresponding to when, relative to a particular promotion, the ad campaign is being made. Based on when the promotion is occurring dictates which selectable definite script element is selected.

Although not shown in FIG. 11, a selectable variable definite script element would be depicted according to the legend as "Script Element: Definite" and where the variable definite script elements that are selectable (i.e., the selectable variable definite script elements) follow a procedure that checks for possible outcomes and causes the process to select a selectable variable definite script element based on the outcome.

In some embodiments, the process performs a check (also referred to as a determination). A corresponding script element is obtained based on the check.

In turn, predetermined criteria can be selected based on the information retrieved from the checking. As shown in FIG. 11, in some embodiments, predetermined criteria 1105 are selected based on the possible outcomes obtained from data retrieval function 1104. In some embodiments, predetermined criteria 1105 can be a threshold based on time, referred to for simplicity as a time threshold. In some embodiments, predetermined criteria 1105 can be an inventory value, referred to simply as inventory criteria. If a first predetermined criteria has been met, then a first definite script element is selected. If a second predetermined criteria has been met, then a second definite script element is selected. If a third predetermined criteria has been met, then a third definite script element is selected. And so on. The concept of fixed and variable have been omitted for ease of understanding. Example predetermined criteria 1105 includes a time threshold that can be in the units of days, hours, minutes, and the like. Example predetermined criteria 1105 can includes an inventory such as an inventory of tickets.

The particular example shown in FIG. 11 involves the sale of tickets for a concert ticket sales campaign. If the creative for the concert ticket sales campaign is for tickets that will be on sale in x days, then a first selectable fixed definite script element 1106 (e.g., "Will be on sale soon") is selected. If the creative for the concert ticket sales campaign is for tickets that are now on sale (e.g., after x minutes from being on sale), then a second selectable fixed definite script element 1108 (e.g., "Are now on Sale") is selected. If the creative for the concert ticket sales campaign is for tickets that are now on sale (e.g., after x minutes from being on sale) and there are y tickets left, then a third selectable fixed definite script element 1110 is selected. As described above x is in units related to time (e.g., days, hours, minutes, etc.) and y is an integer.

As explained above, it should be understood that the selectable definite script elements can be variable. For example, instead of being selectable fixed definite script elements 1106, 1108 and/or 1110, script elements 1106, 1108 and/or 1110 can include fillable fields, where the fillable fields are filled with data obtained from a database. The data that is used to fill the fields can vary based on the outcome of the check. Were this the case, script elements 1106, 1108 and 1110 would be selectable variable definite script elements.

Process 1100 can proceed based on the results of a check for possible outcomes. For example, as shown in block 1114 a determination is made as to whether there exist multiple artists related to a concert ad campaign. The determination as to whether there are multiple artists related to the concert ad campaign can be based on metadata obtained from the promoted entity.

In the example shown in FIG. 11, if a determination is made at block 1114 that there do exist multiple artists associated with the concert ad campaign, then a query 1116 can be sent to a processor. In the example shown in FIG. 11 the query 1116 is a query for the artist with the highest user affinity. The artist with the highest user affinity is performed using now known or future developed processes for selecting an artist with the highest user affinity.

In response data that can be inserted into a variable possible script element 1118 is received. In this example, variable possible script element 1118 is followed by a fixed possible script element 1120.

In some embodiments the variable definite script element contains input corresponding to user context. In some embodiments the variable definite script element contains input related to user preferences. In some embodiments the variable definite script element contains metadata related to a promoted entity. Example variable definite script element 1122 contains a name of an artist received from a metadata database storing metadata related to a promoted entity. Example variable definite script element 1126 contains a name of a venue received from a metadata database storing metadata related to a promoted entity. In some example embodiments, variable definite script element 1126 contains a name of a venue received from a metadata database storing metadata related to a promoted entity that is closest to the recipient of a corresponding creative.

In some example embodiments, variable definite script element 1130 contains a name of a city received from a metadata database storing metadata related to a promoted entity. In some example embodiments, example variable definite script element contains a date of an event received from a metadata database storing metadata related to a promoted entity. For example, variable definite script element 1134 contains a day of the week, variable definite script element 1138 contains a month and variable definite script element 1140 contains a year.

In some embodiments a check for possible outcomes includes collecting one or more information items from a device 106 and determining whether or not a condition related to the device 106 is met (e.g., true). Subsequent checks for possible outcomes are based on the determination as to whether or not the condition related to the device 106 is met.

As shown in block 1144, for example, a determination is made using a mobile device (e.g., devices 106-1, 106-2, and the like) as to whether a user is driving. If not, a determination is then made as to whether the user is in focus, as shown in block 1146. In an embodiment, a user is in focus if the user of the device is looking at the device and is capable of receiving a communication. The communication can be an audio communication, a visual communication, or a combination of an audio communication and visual communication. In another embodiment, the user is in focus if the user of the device is capable of providing physical input to the device. A determination as to whether a user is in focus can be performed by using the sensor components and software of a mobile device 106. In some embodiments, for example, device 106 may optionally include a motion sensor 128, such as a gyro-movement sensor or accelerometer that is arranged to sense that device 106 is in motion and/or is being accelerated or decelerated. In some embodiments, a camera or similar optical sensor can be used to determine whether a user is looking at the device 106. Similarly, audio sensors on device 106 can detect whether a user is present by listening for sounds from the user. Both the audio and visual sensor data can be processed in conjunction with the data relating to whether the device 106 is moving such that if a user is looking at the mobile device but driving, an appropriate script or action will follow.

If a determination is made at block 1144 that the user is driving the call to action process 1100 ends (block 1168).

If a determination is made at block 1144 that the user is not driving and a determination is made at block 1146 that the user is in focus, then a definite script element is played, where the definite script includes an instruction as to how the user of the device 106 should respond, as shown at block 1150. When a script element requests an action of a user via a device, such a script is referred to as a call for action script element.

In this example, the users is instructed via a call for action script element to tap the device to obtain tickets. The device is programmed to wait for a tap (e.g., a tap of a particular icon or simply a tap of the housing of the mobile device which is detected by a vibration sensor in the mobile device, via a capacitive sensor of the mobile device, or other touch or vibration sensing component of the mobile device). If a determination has been made at block 1156 that the device has received a tap, the device 106 proceeds with taking an action. In this example, the action involves a ticketing action, as shown at block 1158. Any number of now known or future known mechanisms for effecting an action upon receipt of user input (e.g., a tap) can be taken. If a determination is made at block 1156 that a user has not tapped the device within a predetermined amount of time (e.g., 30 seconds), then the process ends.

If a determination is made at block 1146 that the user is not in focus, then a determination is made whether the device of the user is in a speakable state, as shown in block 1148. A speakable state is a state in which a user can verbalize a response via a device. If a determination is made at block 1148 that the user is in a speakable state, then a script element containing an utterance including an instruction instructing the user to speak a certain utterance is played through device 106, as shown in block 1152. In the example shown in FIG. 11, script element 1152 is a fixed definite script element. A script element that provides an instruction can also be referred to as an instruction script element. Instruction script elements can be any combination of definite or possible and fixed or variable.

Upon playing the script element 1152, the dynamic call to action process 1100 causes the device 106 to receive a voice utterance as shown in block 1160. In an example implementation, the device 106 receives a voice utterance by turning on the microphone of the device 106, playing a microphone on tone, and turning on a visual listening indicator. Upon receiving an utterance via a microphone, a determination is made at block 1162 as to what the user said. This can be performed by now known or future developed natural language processing functions (e.g., voice recognition). Depending on what the user has uttered will determine the next action. In the example shown there exist three types of actions, a first action, a second action and a third action. It should be understood that there could be more types of actions available.

In the example implementation illustrated in FIG. 11, if a determination has been made at block 1162 that the user said nothing for a predetermined amount of time, the process causes the device to perform a first action. In the example implementation, the first action is an action to play a microphone off tone (block 1166) and an action to end the advertisement (block 1168). If a determination has been made at block 1162 that the user spoke an expected utterance (e.g., "Save this"), the process causes the device to perform a second action as shown in block 1164. In the example implementation, the second action is an is for the device to play a sound indicating that receipt of the instructions was successful, play the microphone off tone (block 1166) and end the advertisement as shown in block 1168.

If a determination is made at block 1162 that the user uttered something else (e.g., an utterance that was not expected by the process), then the process causes the device to perform a third action. In this example the third action is for the device to play an error tone as shown in block 1170 and then, for example, repeat a verbal script instructing the user to speak a certain utterance, as shown in block 1152. Optionally, another verbal script can be provided (not shown).

If a determination is made at block 1148 that the user is not in a speakable state, then at block 1154 the process causes a third script to be played through the device 106. In turn, the process causes the device to wait for a response, as shown in block 1172. In this example, the response that is expected is a double tap that is detected via a sensor (e.g., the accelerometer) of the device 106. If a determination is made at block 1174 that the device received the expected response (e.g., a double tap) then the process causes the device to perform an a second action as shown in block 1164. In the example implementation, the second action is for the device to play a sound indicating that receipt of the instructions was successful (block 1164), play the microphone off tone (block 1166) and end the advertisement (block 1168).

In addition to or instead of an audio sound, a haptic feedback can be initiated by the device 106.

If a determination is made at block 1174 that the user did not double tap within a predetermined time, then the advertisement ends (block 1168).

Figure 12:
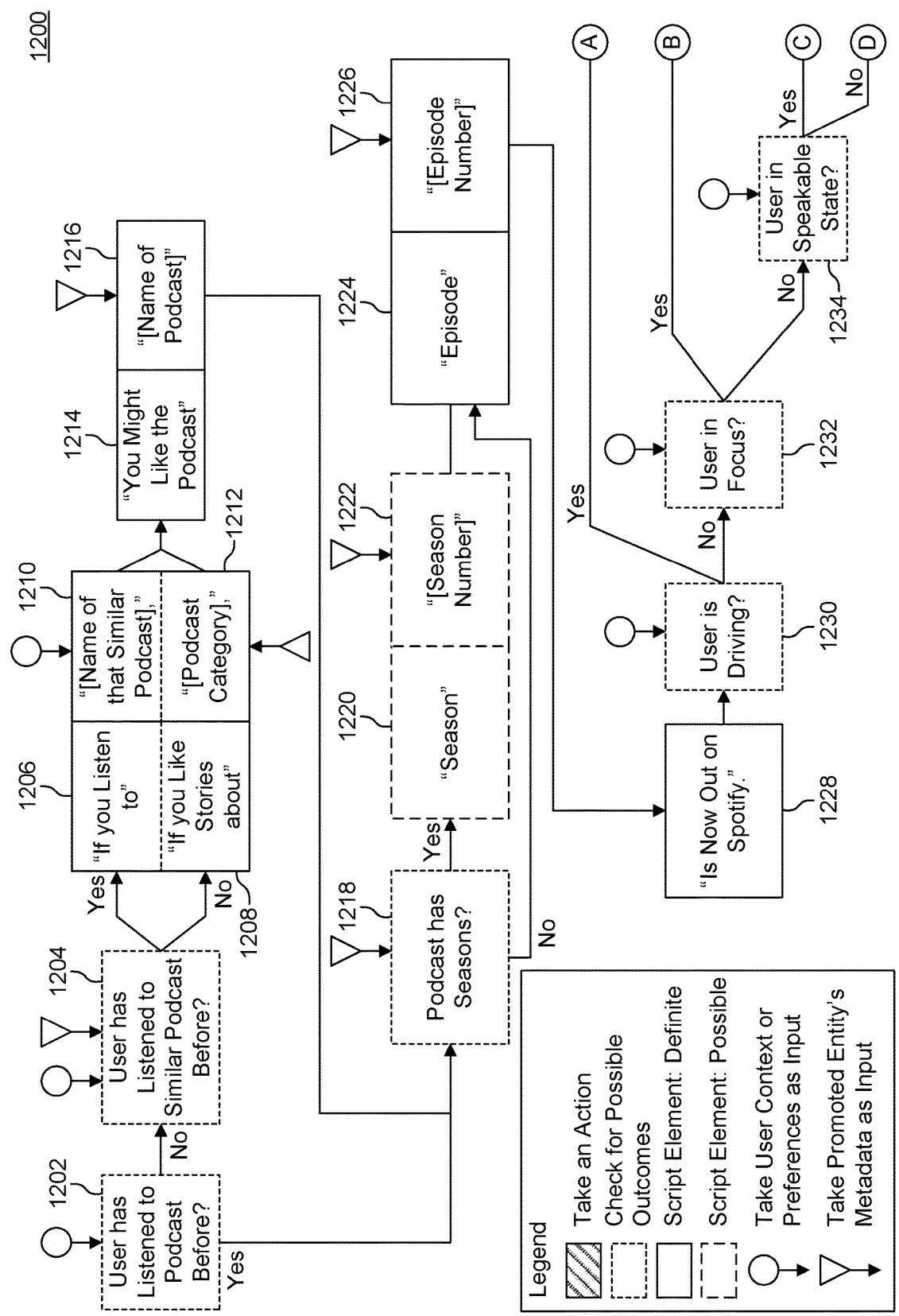
FIG. 12 illustrates a dynamic call to action process in accordance with an example aspect of the present invention.
Figure 12:
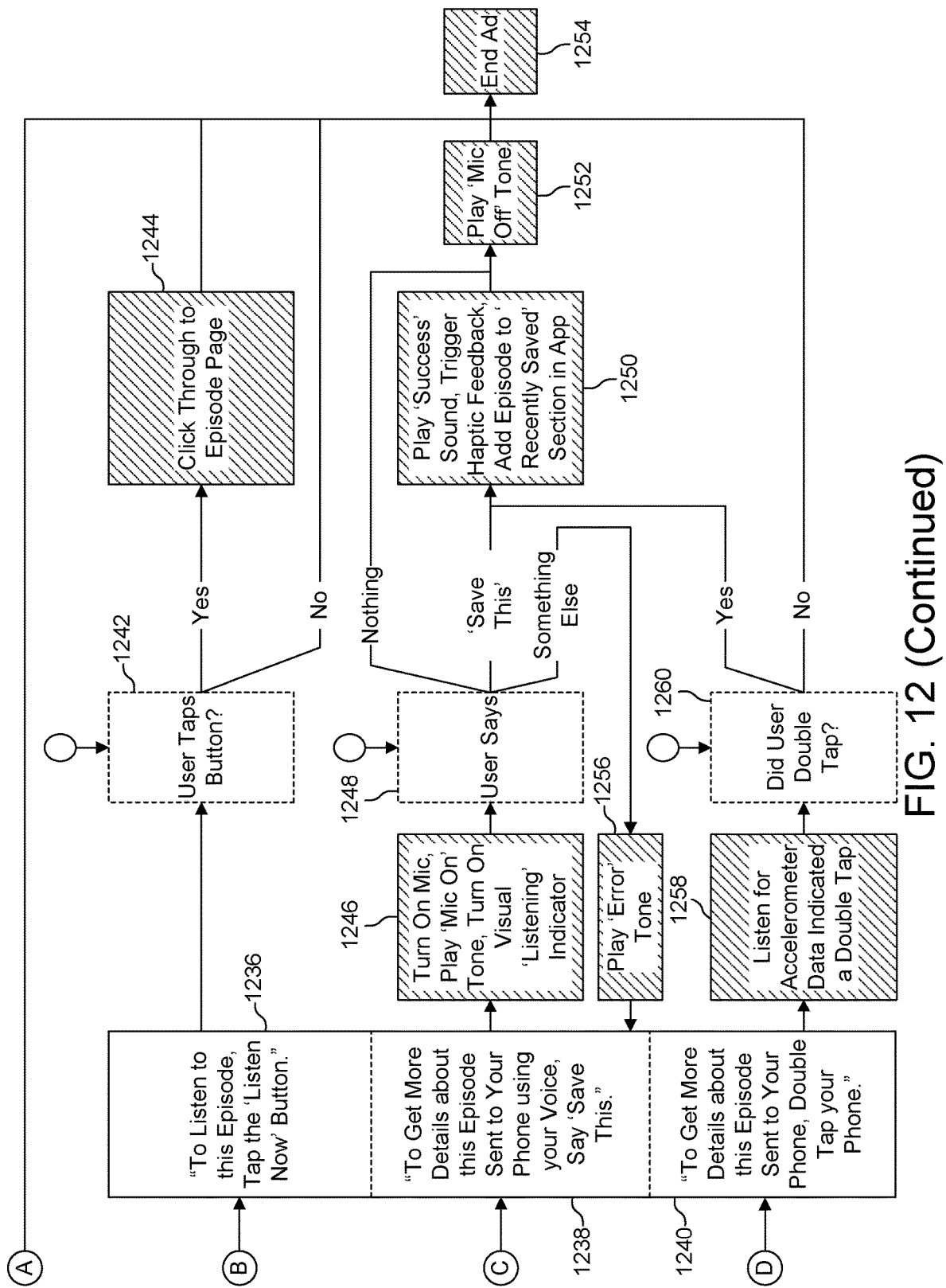

FIG. 12 illustrates a dynamic call to action process 1200 in accordance with an example embodiment. Generally, dynamic call to action process 1200 involves generating scripts that are information and/or calls for action. In the case where the scripts are calls for action the dynamic call to action process causes a device to expect input through its input interface. The input and calls for action are generated according to information associated with a promoted entity (e.g., datapoint values received from a promoter via external system 114, datapoint values associated with a user (e.g., received from a service storing data associated with the user), and datapoint values associated with a device operated by the user (e.g., device 106).

As shown in the legend of FIG. 12, dynamic call to action process 1200 includes (1) taking an action, (2) checking for possible outcomes, (3) supplying script elements that are definite (referred to as definite script elements), (4) supplying script elements that are possible (referred to as possible script elements), (5) taking user context or preferences as input and (6) taking a promoted entities metadata as input.

The example implementation depicted in FIG. 12 relates to an advertisement campaign involving a podcast promotion. The script elements (e.g., definite script elements and possible script elements) are text that are presented (e.g., played back) through a device 106 using, for example, text to speech processing. In an example embodiment at least one or more of the script elements are mixed with other audio or music content (e.g., background music) using the mixing system 1000 described above in connection with FIG. 10 by storing the text to voice generated during the execution of process 1200 as a file. The audio file (e.g., background music) can be obtained as described above in connection with FIG. 9.

In some embodiments, the script elements can be streamed. Thus instead of storing them as a file (e.g., a voiceover file), the script elements can be retrieved in realtime.

Definite script elements can be fixed or variable. A definite script element that is fixed is referred to as a fixed definite script element. A definite script element that is variable is referred to as a variable definite script element. A fixed definite script element is a script element that is in every script for a particular campagin objective (e.g., as selected by a promoter using interface 300A discussed above in connection with FIG. 3A). Example fixed definite script elements are depicted in FIG. 12 according to the legend "Script Element: Definite" and as shown in FIG. 12 have a term or phrase within quotes.

For example, a fixed definite script element for an ad object corresponding to a podcast will always include the term "Episode" (block 1224), and the phrase "Is now out on Spotify" (block 1228). Other fixed definite script elements can include punctuation such as a comma ",", a period ".", a question mark "?", and the like, which when converted to speech cause the speech synthesizer to pause or create an inflection or emphasis points, tone, or other information.

A variable definite script element is a script element that is included in a script and includes content that can vary. Thus, like a fixed definite script element, a variable definite script element is a script element that is always played for a particular campaign objective (e.g., as selected by a promoter using interface 300A discussed above in connection with FIG. 3A) but the value of the variable definite script element will change. For example, a variable definite script element for an ad object corresponding to a podcast can be set to always include an episode number (block 1226), but the episode number itself may vary. Example variable definite script elements are depicted in FIG. 12 according to the legend as "Script Element: Definite" and as shown in FIG. 12 have an attribute of the script element (i.e., the value) within quotes and brackets.

As explained above, a fixed definite script element is used in all scripts generated for a particular type of campaign (e.g., a podcast will always include the phrase "Episode" as shown in block 1324 and "is now out on Spotify" (block 1228)). Such fixed definite script elements can be prestored stored in a memory store. Optionally, such fixed definite script elements can be prestored stored in a memory store that is relatively faster than memory stores that store other data (e.g., variable fixed definite script elements) to increase the speed at which fixed definite script elements can be accessed.

Possible script elements also can be fixed or variable. A possible script element that is fixed is referred to as a fixed possible script element. A possible script element that is variable is referred to as a variable possible script element. Unlike definite script elements, a possible script element is selected based on one or more factors and is not necessarily included in an advertisement creative. In some embodiments, factors that determine whether a possible script element is used include information related to the end user (e.g., user context or user preferences). In some embodiments, factors that determine whether a possible script element is used include information related to the ad campaign. In some embodiments, factors that determine whether a possible script element is used include information related to the device that will receive the ad creative.

In some embodiments, there exist multiple options for either a definite script element or possible script element. Such a definite script element is referred to as a selectable definite script element. For a given situation, a selection of one selectable definite script elements is made. Depending on when the relative campaign start date is, for example, one of multiple selectable definite script elements can be selected (e.g., selectable definite script elements 1206 or 1208, which as explained below, in this example are fixed). Thus if a definite script element is one of several possible definite script elements, then it is referred to as a selectable definite script element.

In some embodiments, selectable definite script elements can be fixed or variable. A selectable definite script element that is fixed is referred to as a selectable fixed definite script element. A selectable definite script element that is variable is referred to as a selectable variable definite script element. Example fixed definite script elements that are selectable (i.e., selectable fixed definite script elements) are depicted in FIG. 12 according to the legend "Script Element: Definite" and where the selectable fixed definite script elements follow a procedure that checks for possible outcomes and causes the process to select a selectable fixed definite script element based on the outcome.

Example procedures that check for possible outcomes include a decision function and a data retrieval function. An example data retrieval function is shown in FIG. 12 as data retrieval function 1202. Data retrieval function 1202 particularly retrieves data corresponding to whether a user has listened to a a particular podcast before. Whether the user has listened to the particular podcast before dictates which selectable definite script element is selected.

As shown in FIG. 12, a selectable variable definite script element is depicted according to the legend as "Script Element: Definite" where the variable definite script elements that are selectable (i.e., the selectable variable definite script elements) follow a procedure that checks for possible outcomes and causes the process to select a selectable variable definite script element based on the outcome. In the example implementation illustrated by FIG. 12, the selectable variable definite script elements are block 1210 ("[Name of that Similar Podcast]"), block 1212 ("[Podcast Category]).

Process 1200 can proceed based on the results of a check for possible outcomes. For example, as shown in block 1202, a determination is made as to whether the user has listened to a particular podcast before, in block 1204, a determination is made as to whether the user has listened to a similar podcast before, in block 1218, a determination is made as to whether the podcast has multiple seasons.

In some embodiments the variable definite script element contains input corresponding to user context. In some embodiments the variable definite script element contains input related to user preferences. In some embodiments the variable definite script element contains metadata related to a promoted entity. Example variable definite script element 1222, for example, contains an episode number of a podcast received from a metadata database storing metadata related to the promoted entity (e.g., the podcast).

In some embodiments a check for possible outcomes includes collecting one or more information items from a device 106 and determining whether or not a condition related to the device 106 is met (e.g., true). Subsequent checks for possible outcomes are based on the determination as to whether or not the condition related to the device 106 is met.

As shown in block 1230, for example, a determination is made using a mobile device (e.g., devices 106-1, 106-2, and the like) as to whether a user is driving. If not, a determination is then made as to whether the user is in focus, as shown in block 1232. In an embodiment, a user is in focus if the user of the device is looking at the device and is capable of receiving a communication. The communication can be an audio communication, a visual communication, or a combination of an audio communication and visual communication. In another embodiment, the user is in focus if the user of the device is capable of providing physical input to the device. A determination as to whether a user is in focus can be performed by using the sensor components and software of a mobile device 106. In some embodiments, for example, device 106 may optionally include a motion sensor 128, such as a gyro-movement sensor or accelerometer that is arranged to sense that device 106 is in motion and/or is being accelerated or decelerated. In some embodiments, a camera or similar optical sensor can be used to determine whether a user is looking at the device 106. Similarly, audio sensors on device 106 can detect whether a user is present by listening for sounds from the user. Both the audio and visual sensor data can be processed in conjunction with the data relating to whether the device 106 is moving such that if a user is looking at the mobile device but driving, an appropriate script or action will follow.

If a determination is made at block 1230 that the user is driving the call to action process 1200 ends (block 1254).

If a determination is made at block 1230 that the user is not driving and a determination is made at block 1232 that the user is in focus, then a definite script element is played, where the definite script includes an instruction as to how the user of the device 106 should respond, as shown at block 1236. When a script element requests an action of a user via a device, such a script is referred to as a call for action script element.

In this example, the users is instructed via a call for action script element to tap the device to listen to a media item (e.g., a podcast media item). The device is programmed to wait for a tap (e.g., a tap of a particular icon or simply a tap of the housing of the mobile device which is detected by a vibration sensor in the mobile device). If a determination has been made at block 1242 that the device has received a tap, the device 106 proceeds with taking an action. In this example, the action involves clicking through to an episode page, as shown at block 1244. Any number of now known or future known mechanisms for effecting an action upon receipt of user input (e.g., a tap) can be taken. If a determination is made at block 1242 that a user has not tapped the device within a predetermined amount of time (e.g., 30 seconds), then the process ends (block 1254).

If a determination is made at block 1232 that the user is not in focus, then a determination is made whether the device of the user is in a speakable state, as shown in block 1148. A speakable state is a state in which a user can verbalize a response via a device. If a determination is made at block 1234 that the user is in a speakable state, then a script element containing an utterance including an instruction instructing the user to speak a certain utterance is played through device 106, as shown in block 1238. In the example shown in FIG. 12, script element 1238 is a fixed definite script element. A script element that provides an instruction can also be referred to as an instruction script element. Instruction script elements can be any combination of definite or possible and fixed or variable.

Upon playing the script element 1238, the dynamic call to action process 1200 causes the device 106 to receive a voice utterance as shown in block 1246. In an example implementation, the device 106 receives a voice utterance by turning on the microphone of the device 106, playing a microphone on tone, and turning on a visual listening indicator. Upon receiving an utterance via a microphone, a determination is made at block 1248 as to what the user said. This can be performed by now known or future developed natural language processing functions (e.g., voice recognition). Depending on what the user has uttered will determine the next action. In the example shown there exist three types of actions, a first action, a second action and a third action. It should be understood that there could be more types of actions available.

In the example implementation illustrated in FIG. 12, if a determination has been made at block 1246 that the user said nothing for a predetermined amount of time, the process causes the device to perform a first action. In the example implementation, the first action is an action to play a microphone off tone (block 1252) and an action to end the call to action process (block 1254). If a determination has been made at block 1248 that the user spoke an expected utterance (e.g., "Save this"), the process causes the device to perform a second action as shown in block 1250. In the example implementation, the second action is an is for the device to play a sound indicating that receipt of the instructions was successful, play the microphone off tone (block 1252) and end the call to action process 1200 as shown in block 1254.

If a determination is made at block 1248 that the user uttered something else (e.g., an utterance that was not expected by the process), then the process causes the device to perform a third action. In this example, the third action is for the device to play an error tone as shown in block 1256 and then, for example, repeat a verbal script instructing the user to speak a certain utterance, as shown in block 1238. Optionally, another verbal script can be provided (not shown).

If a determination is made at block 1234 that the user is not in a speakable state, then at block 1240 the process causes a third script to be played through the device 106. In turn, the process causes the device to wait for a response, as shown in block 1260. In this example, the response that is expected is a double tap that is detected via a sensor (e.g., the accelerometer) of the device 106. If a determination is made at block 1260 that the device received the expected response (e.g., a double tap) then the process causes the device to perform an a second action as shown in block 1250. In the example implementation, the second action is for the device to play a sound indicating that receipt of the instructions was successful (block 1164), play the microphone off tone (block 1252) and end the call to action process 1200 (block 1254).

In addition to or instead of an audio sound, a haptic feedback can be initiated by the device 106.

If a determination is made at block 1260 that the user did not double tap within a predetermined time, then the call to action process 1200 ends (block 1254).

The voiceover length may vary as possible script elements get added or chosen from a set of possible variations. As such the length or lengths of the background music that is mixed with the script elements may need to be modified. Background music that is mixed can be clipped or extended to accommodate this variable voiceover length in several ways.

In one example embodiment, the background music clips are arranged as loop-able segments. The number of loops can be selected, for example, based on voiceover length.

In another embodiment, the top n clips (where n is an integer) are ranked for different lengths (e.g., clip for 30s, clip for 8s). How the clips are ranked can vary (e.g., based on affinity, relevance, and the like). In some embodiments, the ranked list that is selected is based on voiceover length In another example embodiment, a background clip for the longest possible voiceover is selected and analyzed for possible earlier breakpoints if the voiceover is shorter. The analysis is performed using now known or future developed mechanisms for determining breakpoints.

The call to action processes described above with respect to FIGS. 11 and 12 can be performed by one or more processors. Particularly, when the methods described herein are executed by the one or more processors, the one or more processors perform the dynamic call to action processes. For convenience the one or more processors that perform the dynamic call to action processes are called call to action processor. The one or more processors described below in connection with a script processor can be the same or different as those used in connection with the call to action processor. Accordingly, in some example embodiments, the call to action processor performs at least some of the procedures performed by the script processor. In some embodiments, the script processor performs at least some of the same procedures performed by the call to action processor.

Inserting Localized or Personalized Spots into Ads

FIG. 13 illustrates an example personalized spot, a generic spot and background music according to an example embodiment. The input to the system is a text script that includes "personalized fields". The text that is not a part of a personalized field is referred to as the "generic spot", and each personalized field is designated as a "personalized spot". The personalized spots are given as a list of values (e.g. a list of dates), and are generated both manually (e.g. for an artist's tour locations) or automatically (e.g. user's names, locations). The output of the system—the personalized audio advertisement—is delivered in real-time by a media distribution server 112 to the end-user. These examples can be used as voiceover script elements.

In the example depicted in FIG. 13, the personalized spot that is generated is converted to a personalized voice file 1302. In turn, the personalized voice file 1302 is mixed with background music that has been saved as a background music file 1306.

Similarly, the generic spot that is generated is converted to a generic voice file 1304. In turn, the generic voice file 1304 is mixed with background music that has been saved as a background music file 1306.

In some embodiments, a script processor (not shown) is used to generate a script (or script section) based on, for example, input provided through a graphical user interface. In some embodiments, the script is generated by the script processor based on script sections received over a network.

The mechanism for mixing is described above in connection with FIG. 10. Referring to both FIGS. 10 and 13, the personalized voice file 1302 is the voice file 1004-2 and the background music file 1306 is music file 1006-2.

Example Scripts

The following are some example scripts in accordance with some embodiments. "Hey [user's name], enjoying listening to [artist]? We think you might also enjoy [related artist]."

"Hey [user's name]! You've listened to [artist] [number] times this month! As a way to say thanks, we'd like to offer you presale tickets to their show on [date] at [venue]. Click on the banner to access to unlock this offer"

"There are only [number] more tickets left for [artist]'s show at [venue] on [date]! Click on the banner to get tickets for as low as [price]!"

[dynamic creatives in 3P ads]

Mobile gaming: "Oh no! looks like you have [x] life left! Listen to [track name] for [y] more!"

Generic Spot Creation

The generic spot need only be created once. Ideally, a single voice actor (or virtual voice actor) will read through all portions of the generic script. For example, reading the script:

"[Hey user] Did you know that Saint Lucia is going to light up the stage with special guests Joe Artist? After opening for Patty Artist and Charlie Artist, Saint Lucia is ready to bring the dance party to [venue on date]. Tickets on sale now at www dot ticket seller dot com."

In order to splice this generic spot with personalized spots, the audio is segmented. A text alignment system is utilized to find break points (i.e. where the [ ] segments occur).

The voice actor for the generic spot could be, for example, a synthesized voice, an artist or a famous actor.

Personalized Spot Creation

When using a virtual voice actor to create audio segments, the profile of the virtual voice actor is chosen to most closely match the sound and style of the voice actor in the generic spot. To match profiles, timbre, pitch, and speaking contour descriptors are automatically extracted from the generic spot's voice over, and used to drive the parameters of the virtual voice actor. When using a human voice actor, if the list of personalized spots is small (e.g. <100), a single voice actor reads each of them in sequence " . . . at Madison Square Garden in New York City on December 2nd . . . at the Shoreline Amphitheatre in Mountain View on December 8th . . . ". The spots are then segmented using the text alignment system described in the previous section.

The voice actor is either the same as for the generic spot, instructed to match the sound and style of the generic spot's voice actor, or given custom instructions provided by the user.

Spot Segment Post-Processing

Each of the segments (general and personalized) are automatically mastered and normalized (volume adjustments and silence removal) as described above in connection with FIG. 10.

Delivering Ads with Personalized Spots

Targeting is passed through the ad system and the corresponding personalized spots can be fetched by the metadata associated with the track.

For instance the pre-generated track:

"Enjoying listening to <BandX>? We think you might also enjoy <BandY>" will have the metadata tagged with {"currentArtist": "BandX", "suggestedArtist": "BandY"}.

When the ad server determines that the user is in the correct context to serve a promoted suggestion of {"curren-tArtist": "BandX", "suggestedArtist": "BandY"}, then the pre-generated track will be fetched and served at that time. This example can be extended to more numbers of vectors in the personalization.

Figure 14:
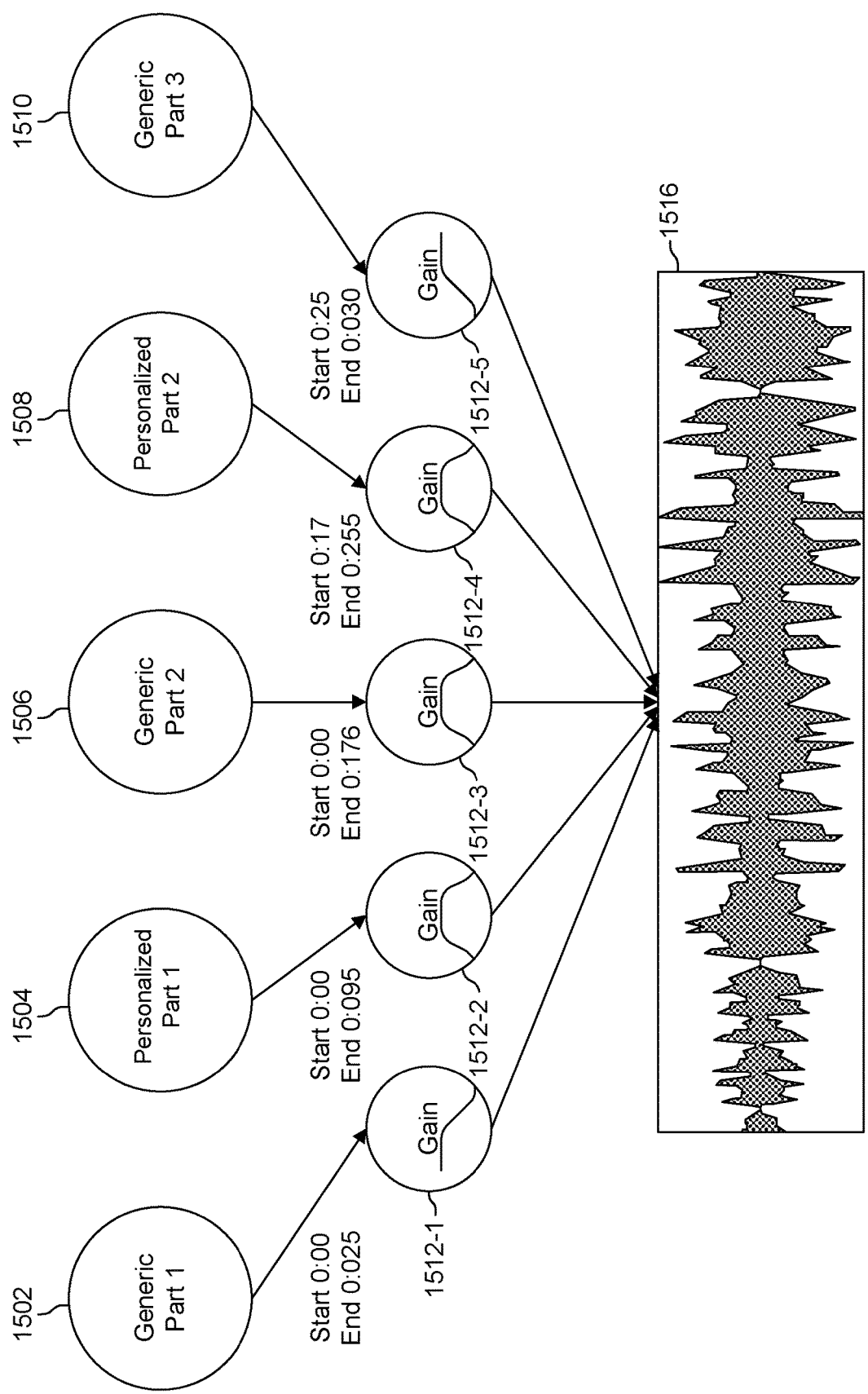
FIG. 14 illustrates a delivered audio file that has been created in real-time in accordance with an example aspect of the present invention.

FIG. 14 illustrates a delivered audio file 1516 that has been created in real-time according to the example embodiments described herein. As shown in FIG. 14, the selected personalized spots 1504, 1508 are delivered with a set of start time, end time, and volume instructions. Similarly, the selected generic spots 1502, 1506 and 1510 are delivered with a set of start time, end time and volume instructions. Post-processed generic spots and personalized spots are merged using a short crossfade (as illustrated in the "gain" 1512-1, 1512-2, 1512-3, 1512-4, and 1512-5 and overlapping start/end time parameters) to ensure a seamless transition.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

What is claimed is:

1. A computer-implemented call to action method, comprising the steps of:
    receiving a plurality of campaign objective datapoints, each campaign objective datapoint containing data associated with a campaign objective;
    receiving entity metadata containing data associated with an entity;
    automatically generating a creative including text based on the plurality of campaign objective datapoints and the entity metadata, the creative including at least one fixed definite script element and at least one variable definite script element, wherein:
    each fixed definite script element is a script element comprising text that is in every script for the campaign objective and does not vary and each variable definite script element is a script element comprising text that is included in every script for the campaign objective that varies, wherein automatically generating the creative includes arranging the at least one fixed definite script element and the at least one variable definite script element in an automatically arranged order;
    converting, using a text to voice processor, the text of the creative into voice content in the automatically arranged order;
    electronically presenting to a device the voice content, thereby presenting the at least one fixed definite script element and the at least one variable definite script element in the automatically arranged order;
    receiving an indication from the device whether a user of the device is in focus;
    presenting a first call for action script element via the device when the indication indicates the user of the device is in focus; and
    presenting a second call for action script element via the device when the indication indicates the user of the device is not in focus.

2. The computer-implemented method according to claim 1, further comprising the steps of:
    receiving a user datapoint containing data associated with the user of the device; and
    automatically generating at least one variable definite script element based on the user datapoint, wherein each variable definite script element is a script element comprising variable text that is in one or more scripts for the campaign objective.

3. The computer-implemented method according to claim 1, generating the creative further comprising the steps of:
    selecting one of a plurality of possible script elements to obtain the variable definite script element; and
    communicating over a network the variable definite script element.

4. The computer-implemented method according to claim 1, further comprising the steps of:
    receiving over a network an information item from the device;
    determining whether the information item from the device meets a condition; and
    presenting a third call to action script via the device if the information item meets the condition; and
    presenting a fourth call to action script via the device if the information item does not meet the condition.

5. The computer-implemented method according to claim 1, further comprising the steps of:
    determining whether a response has been received from the device, wherein:
        if no response has been received by the device, presenting via the device a no-response message indicating that no response has been received,
        if a valid response has been received by the device, presenting via the device a valid response message indicating that a response has been received; and
        if an invalid response has been received by the device, presenting via the device an invalid response message and communicating another call for action script.

6. The computer-implemented method according to claim 5, further comprising the steps of:
    determining if the device receives a tap;
    performing a first operation if the device received the tap; and
    performing a second operation if the device did not receive the tap.

7. A system for performing call to action, comprising:
    a call to action processor operable to:
        receive a campaign objective datapoint containing data associated with a campaign objective;
        receive entity metadata containing data associated with an entity;
        receive a user datapoint containing data associated with a user of a device;
        automatically generate a creative including text based on the campaign objective datapoint and the entity metadata, the creative including at least one fixed definite script element and at least one variable definite script element, wherein:

each fixed definite script element is a script element comprising fixed text that is in every script for the campaign objective;

each variable definite script element is a script element comprising variable text that is in every script for the campaign objective, the text varying based, at least in part, on at least one of:
 the campaign objective datapoint;
 the entity metadata;
 the device; and
 the user datapoint; and automatically generating the creative includes automatically arranging the text of the creative in an automatically arranged order, the text including the text of the at least one fixed definite script element and the text of the at least one variable definite script element; and a text to voice processor operable to:
 convert the text of the creative into voice content in the automatically arranged order; and the call to action processor further operable to:
 electronically present to the device the voice content in the automatically arranged order;
 receive an indication from the device whether the user of the device is in focus;
 present a first call for action script element via the device when the indication indicates the user of the device is in focus; and
 present a second call for action script element via the device when the indication indicates the user of the device is not in focus.

8. The system according to claim 7, the call to action processor further operable to:
 select at least one variable possible script element to include in the creative, wherein each variable possible script element is a script element comprising variable text that is in one or more scripts for the campaign objective.

9. The system according to claim 8, the call to action processor is further operable to:
 determine to include the at least one variable possible script element in the creative based, at least in part, on at least one of:
 the campaign objective datapoint;
 the entity metadata;
 the device; and
 the user datapoint.

10. The system according to claim 7, the call to action processor further operable to:
 select one of a plurality of fixed possible script elements to obtain a selected script element to include in the creative, wherein each fixed possible script element is a script element comprising fixed text that is in one or more scripts for the campaign objective; and
 communicate over a network the selected script element.

11. The system according to claim 7, the call to action processor further operable to:
 receive over a network an information item from the device;
 determine whether the information item from the device meets a condition; and
 present a third call to action script via the device if the information item meets the condition; and
 present a fourth call to action script via the device if the information item does not meet the condition.

12. The system according to claim 7, the call to action processor further operable to:

determine whether a response has been received from the device, wherein:
 if no response has been received by the device, present via the device a no-response message indicating that no response has been received,
 if a valid response has been received by the device, present via the device a valid response message indicating that a response has been received; and
 if an invalid response has been received by the device, present via the device an invalid response message and communicating another call for action script.

13. The system according to claim 12, the call to action processor further operable to:
 determine if the device receives a tap;
 perform a first operation if the device received the tap; and
 perform a second operation if the device did not receive the tap.

14. A non-transitory computer-readable medium having stored thereon one or more sequences of instructions for causing one or more processors to perform:
 receiving a campaign objective datapoint containing data associated with a campaign objective;
 receiving entity metadata containing data associated with an entity;
 receiving a user datapoint containing data associated with a user of a device;
 automatically generating a creative including text based on the campaign objective datapoint and the entity metadata, the creative including at least one fixed definite script element and at least one variable definite script element, wherein:
 each fixed definite script element is a script element comprising fixed text that is in every script for the campaign objective;
 each variable definite script element is a script element comprising variable text that is in every script for the campaign objective, the text varying based, at least in part, on at least one of:
 the campaign objective datapoint;
 the entity metadata;
 the device; and
 the user datapoint; and
 automatically generating the creative includes automatically arranging the text of the creative, the text including the text of the at least one fixed definite script element and the text of the at least one variable definite script element;
 converting the text of the creative into voice content in the automatically arranged order; and
 electronically presenting to the device the voice content in the automatically arranged order;
 receiving an indication from the device whether the user of the device is in focus;
 presenting a first call for action script element via the device when the indication indicates the user of the device is in focus; and
 presenting a second call for action script element via the device when the indication indicates the user of the device is not in focus.

15. The computer-readable medium of claim 14, further having stored thereon a sequence of instructions for causing the one or more processors to perform:
 selecting at least one fixed possible script element based on at least one of:
 the campaign objective data point;
 the entity metadata
 the device; and
 the user datapoint.

16. The computer-readable medium of claim 14, further having stored thereon a sequence of instructions for causing the one or more processors to perform:

selecting one of a plurality of variable possible script elements to obtain a selected script element to include in the creative, wherein each variable possible script element is a script element comprising variable text that is in one or more scripts for the campaign objective; and communicating over a network the selected script element.

17. The computer-readable medium of claim 14, further having stored thereon a sequence of instructions for causing the one or more processors to perform:

receiving over a network an information item from the device;

determining whether the information item from the device meets a condition; and presenting a third call to action script via the device if the information item meets the condition; and presenting a fourth call to action script via the device if the information item does not meet the condition.

18. The computer-readable medium of claim 14, further having stored thereon a sequence of instructions for causing the one or more processors to perform:

determining whether a response has been received from the device, wherein:
- if no response has been received by the device, presenting via the device a no-response message indicating that no response has been received,
- if a valid response has been received by the device, presenting via the device a valid response message indicating that a response has been received; and
- if an invalid response has been received by the device, presenting via the device an invalid response message and communicating another call for action script.

19. The computer-readable medium of claim 18, further having stored thereon a sequence of instructions for causing the one or more processors to perform:

determining if the device receives a tap;

performing a first operation if the device received the tap; and performing a second operation if the device did not receive the tap.

* * * * *